US008177137B2

(12) United States Patent
Arai

(10) Patent No.: US 8,177,137 B2
(45) Date of Patent: May 15, 2012

(54) SENSOR DEVICE HAVING NON-CONTACT CHARGE FUNCTION AND CONTAINERS HAVING THE SAME

(75) Inventor: Yasuyuki Arai, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1199 days.

(21) Appl. No.: 11/892,344

(22) Filed: Aug. 22, 2007

(65) Prior Publication Data

US 2008/0062066 A1 Mar. 13, 2008

(30) Foreign Application Priority Data

Sep. 8, 2006 (JP) ................................ 2006-243775

(51) Int. Cl.
*G06F 17/00* (2006.01)
*G06K 19/00* (2006.01)
*G06K 19/06* (2006.01)
*H01Q 21/00* (2006.01)

(52) U.S. Cl. ........ 235/492; 235/375; 235/487; 343/867; 343/879; 343/893

(58) Field of Classification Search .................. 235/492, 235/375, 487, 494; 343/867, 879, 893
See application file for complete search history.

(56) References Cited

U.S. PATENT DOCUMENTS 6,378,774 B1 * 4/2002 Emori et al. .................. 235/492
6,734,825 B1 * 5/2004 Guo et al. .............. 343/700 MS
6,837,438 B1 1/2005 Takasugi et al.
2006/0118638 A1 * 6/2006 Odake et al. .................. 235/492
2007/0118335 A1 * 5/2007 Andarawis et al. ........... 702/188

FOREIGN PATENT DOCUMENTS

| | | | |
|---|---|---|---|
| JP | 2000-216715 | A | 8/2000 |
| JP | 2000-306188 | A | 11/2000 |
| JP | 2001-022905 | A | 1/2001 |
| JP | 2001-187611 | | 7/2001 |
| JP | 2005-310128 | | 11/2005 |
| JP | 2006-127363 | A | 5/2006 |
| JP | 2006-185050 | A | 7/2006 |

* cited by examiner

*Primary Examiner* — Michael G Lee
*Assistant Examiner* — Laura Gudorf
(74) *Attorney, Agent, or Firm* — Eric J. Robinson; Robinson Intellectual Property Law Office, P.C.

(57) ABSTRACT

A first base having a first antenna receiving electromagnetic waves and a second base having a sensor portion are separated. An antenna is provided over each of the first base and the second base such that the antennas are electromagnetically coupled. The first antenna constantly receives electromagnetic waves to generate electromotive force and charges a power storage portion. Since the electric power of the power storage portion is also used for driving of a sensor portion, the sensor portion operates even without communication with the external device. Provision of the first antenna receiving electromagnetic waves and the sensor portion on different bases permits miniaturization of a base having the sensor portion. Further, provision of the power storage portion storing electric power converted from electromagnetic waves received by the antenna enables operating the sensor actively.

20 Claims, 18 Drawing Sheets

SENSOR DEVICE HAVING NON-CONTACT CHARGE FUNCTION AND CONTAINERS HAVING THE SAME

BACKGROUND OF THE INVENTION

1. Field of the Invention

The present invention relates to a sensor device, which performs communication of data and supply/reception of drive electric power without contact, and containers having the same.

2. Description of the Related Art

Most of the products commercially available such as foods, medicines, and materials of the same are preserved in airtight containers to maintain safety, hygiene, and quality thereof. For example, some fresh foods or soft drinks are transported by vehicles in which the temperature of trunks can be controlled so that freshness can be preserved. Some medicines or foods lose their value as products once containers in which products are preserved are opened. That is, there is a case where confidence in the products' safety may be diminished.

However, there is a problem in that consumers purchasing goods at the retail stage cannot know accurately how the products have been managed in the distribution process. For example, consumers cannot easily determine whether the descriptions of the label on the products are true or not, even when the descriptions have been falsified.

A method for identification and certification using minute IC chips to manage products has received attention. IC chips are connected to antennas, or antennas are formed on IC chips to transmit and receive signals through wireless communication. With IC chips attached to tags or labels on products after identifiable information and the like is stored therein, this certification method is expected to perform effective management using computers. Information stored in IC chips is read by wireless communication using external devices called reader/writers. At this time, electric power needed for the operation of IC chips is covered by induced electromotive force generated from electromagnetic waves, which is outputted from external devices.

In addition, operating IC tags actively instead of using them only for certification is now under consideration. For example, an IC tag, which enables wireless communication with an external device to which a sensor capable of measuring the physical quantity of an object is attached, is disclosed (see Reference 1: Japanese Published Patent Application No. 2001-187611). The IC tag with the sensor includes a battery chargeable with electromagnetic waves for electric power, which is supplied from the external device as well as a communication portion, a CPU, and a temperature sensor.

SUMMARY OF THE INVENTION

However, if a battery is charged by receiving radio waves for electric power, the size of an antenna needs to be larger, thereby making the antenna highly sensitive for sufficient charge. As a result, an IC tag with the sensor, which is mounted with the battery chargeable with radio waves for electric power cannot be miniaturized. The IC tag with the sensor has various applications and the IC tag with the sensor causes inconvenience when it is attached to compact containers.

Thus, it is an objective of the present invention to miniaturize an IC tag with the sensor or a sensor device, which have a charge function and a function of transmission and reception of signals without contact. That is, providing the IC tag with the sensor or the sensor device, which can be easily attached to even compact containers or included therein, is an objective of the present invention.

The sensor device includes an antenna for receiving electromagnetic waves; a power storage portion for storing electric power obtained by rectification of induced electromotive force generated when the antenna absorbs electromagnetic waves; a Central Processing Unit, which operates with power supplied from the power storage portion; and a sensor portion for inputting signals into the CPU. The Central Processing Unit, which is also called CPU, is a circuit for transferring and processing data in accordance with a program and controlling associated devices, includes the following: an Arithmetic Logic Unit (ALU) for performing operation; a register for storing data temporally; a bus interface for performing input/output into/from memories and peripheral devices; and a control portion for controlling the whole CPU. Hereinafter, functional elements for logical operation processes, which are included in the sensor device, are also referred to as a CPU. A non-contact charge function can be provided to the sensor device by charging the power storage portion with induced electromotive force generated by absorption of electromagnetic waves propagating in the air. In this case, the antenna for receiving electromagnetic waves is preferably a multi-frequency common antenna. Further, the sensor device may include a charge and discharge control circuit controlling electric power of the storage portion, a memory circuit storing data or programs, and circuits having other particular functions.

The antenna constantly receives electromagnetic waves propagating in the air to generate induced electromotive force, thereby charging the power storage portion. Alternatively, when the external device transmits electromagnetic waves, the antenna may receive the electromagnetic waves to generate induced electromotive force, so that the power storage portion is charged. In any case, the sensor device in accordance with the present invention has a structure in which the antenna is combined with the rectification circuit and the power storage portion, thereby making use of electromagnetic waves propagating in the air to generate electric power needed for the operation of the device.

In the sensor device having the foregoing structure, the antenna and the sensor portion are provided over different bases so that the different bases can perform transmission and reception of electric power and signals to each other using electromagnetic-coupled antennas. By separating a base receiving electromagnetic waves from a base provided with the sensor portion, miniaturization of the sensor portion can be achieved while the charge function can be improved.

According to the present invention, provision of the antenna receiving electromagnetic waves and the sensor potion over the different bases makes it possible to miniaturize the base having the sensor portion. In addition, electromagnetic waves are converted into electric power using the antenna and the power storage portion for storing the electronic power is provided; thus, the physical quantity of a target object can be detected by active operation of the sensor. In this case, since enlargement of the antenna for receiving electromagnetic wave is permitted, a significant antenna gain can be obtained. Moreover, the second base including the sensor portion can be miniaturized so that the second base can be included in compact containers or minute capsules.

DETAILED DESCRIPTION OF THE INVENTION

Figure 1:
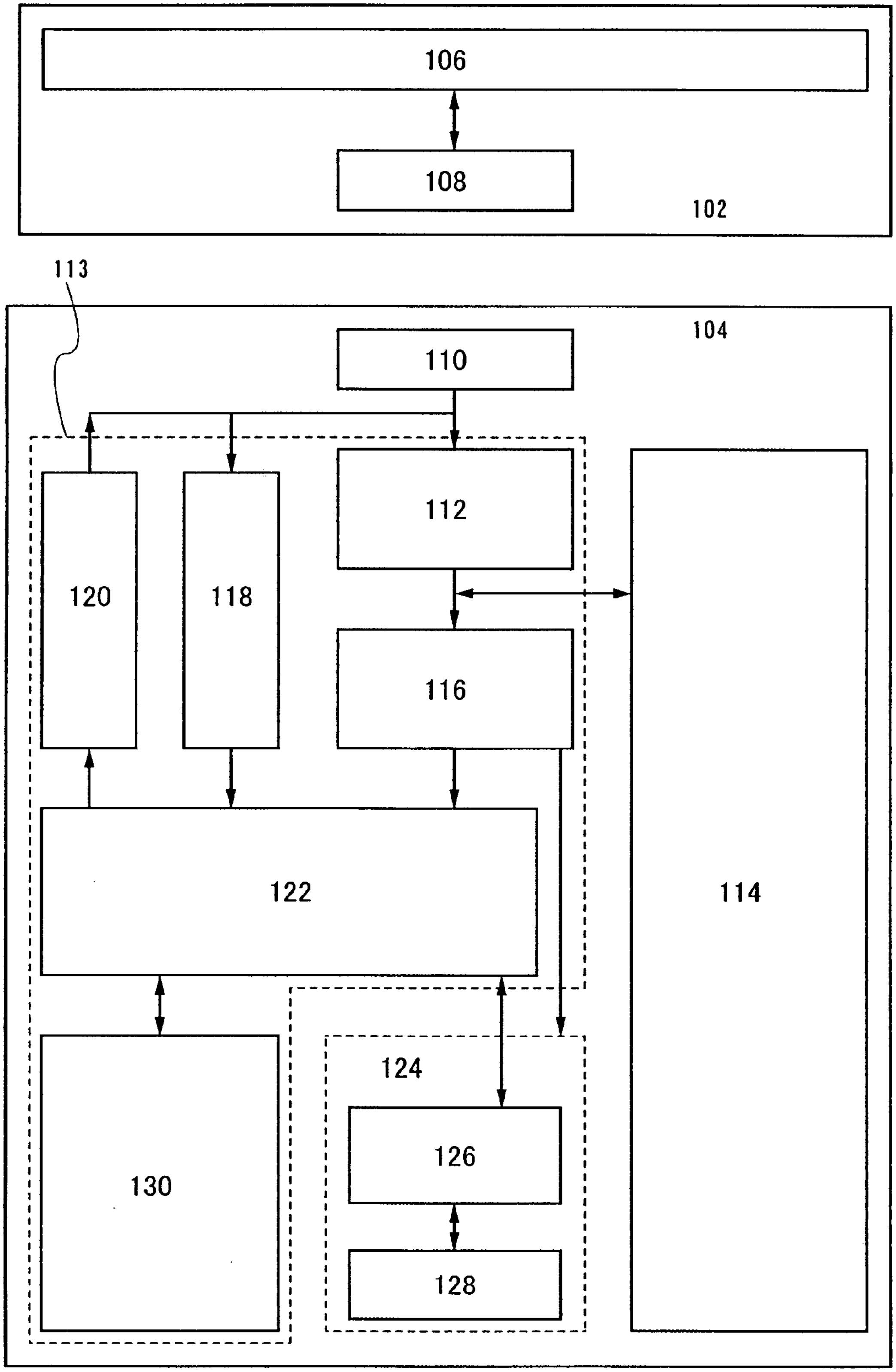
FIG. 1 shows a structure of a sensor device in accordance with Embodiment Mode 1.

A sensor device in accordance with the present invention includes a first antenna for receiving electromagnetic waves transmitted from an external device to a first base, and a second antenna electrically connected to the first antenna. A second base includes a third antenna electromagnetically coupled to the second antenna; a power storage portion for storing electric power obtained by rectification of electromagnetic waves received by the third antenna; and a sensor portion, which operates with electric power supplied from the power storage portion. In the sensor device, the first base and the second base are separated.

In the present invention, the frequency of electromagnetic waves received by the first antenna is not limited in particular, and any of the following may be included: a submillimeter-wave of 300 GHz to 3 THz; a millimeter-wave of 30 GHz to 300 GHz; a microwave of 3 GHz to 30 GHz; an ultrashort-wave of 300 MHz to 3 GHz; a very short-wave of 30 MHz to 300 MHz; a short-wave of 3 MHz to 30 MHz; a medium-wave of 300 KHz to 3 MHz; a long-wave of 30 KHz to 300 KHz; and a very long-wave of 3 KHz to 30 KHZ. At least the first antenna may have a function that can receive a part or the whole of these frequency bands of electromagnetic waves.

Moreover, according to one aspect of the present invention, a sensor device may include a first antenna for receiving electromagnetic waves transmitted from an external device to a first base, a power storage portion for storing electric power obtained by rectification of electromagnetic waves received by the first antenna, each of which is on the first base; and a second antenna for transmitting electric power supplied from the power storage portion after the electric power is modulated, and a third antenna electromagnetically coupled to the second antenna and a sensor portion operates with electric power obtained by rectification of electromagnetic waves by the third antenna, each of which is on a second base.

In accordance with the structure mentioned above, the second base can be further miniaturized. That is, the sensor portion includes the first base having the antenna portion receiving electromagnetic waves transmitted from the external device, the sensor portion capable of measuring the physical quantity of an object, and the second base having the power storage portion storing electric power obtained by conversion of electromagnetic waves received by the antenna portion. The sensor device has a form such that communication and supply/reception of electric power between the first base and the second base are performed using the coil antenna electromagnetically coupled.

Embodiment modes of the present invention will be described below with reference to the drawings. It is easily understood by those skilled in the art that the present invention can be carried out with various changes and modifications without departing from the spirit and the scope of the invention. Accordingly, the invention should not be construed as being limited to the in Embodiment Modes. Note that reference numerals denote like elements or elements having like functions throughout the drawings hereinafter referred to, and the explanations will not be repeated.

Embodiment Mode 1

This embodiment mode will describe a structure in which an antenna for receiving electromagnetic waves and a sensor portion are provided on different bases in order to miniaturize the sensor device having a non-contact charge function with reference to drawings. In addition, this embodiment mode will describe a structure of the sensor device in which a first antenna for receiving electromagnetic waves is formed over a first base, and a CPU, a sensor portion, and a power storage portion for supplying electric power thereto are provided over a second base.

FIG. 1 is a block diagram showing a structure of the sensor device in accordance with this embodiment mode. This sensor device is composed of a first base 102 and a second base 104, which is separated from the first base 102. A first antenna 106 receiving electromagnetic waves is provided to the first base 102. The first antenna 106 constantly receives electromagnetic waves of from a submillimeter-wave band to a very long-wave band, which propagates in the air. Alternatively, the first antenna 106 can receive electromagnetic waves transmitted from an external device. The external device includes an antenna for transmitting electromagnetic waves and a reader/writer device employed in a technique for reading and rewriting of data stored in the IC chip using wireless communication called RFID (radio frequency identification).

As a mode of the first antenna 106, various kinds of antenna corresponding to frequency that the first antenna 106 receives can be employed. For example a loop antenna, a spiral coil antenna, a monopole antenna, a dipole antenna, and a patch antenna. In addition, a multi-frequency common antenna that can receive electromagnetic waves at plural frequency bands such as 13 MHz, 900 MHz, and 2 GHz.

The first base 102 is provided with a second antenna 108 electrically connected to the first antenna 106. The second antenna 108 is an antenna electromagnetically coupled to a third antenna 110 provided over the second base 104. With this second antenna 108, electromagnetic waves received by the first antenna 106 can be transmitted to the second base 104.

To electromagnetically couple the second antenna 108 to the third antenna 110, for example, the two antennas are preferably formed of spiral coil antennas. The second antenna 108 is separated from the antenna 106, so that the size and the shape can be appropriately determined corresponding to the shape of the third antenna. Further, the first antenna 106 can be enlarged, by increasing the number of windings or increasing a winding diameter to improve receiver sensitivity.

Induced electromotive force generated due to the reception of electromagnetic waves by the third antenna 110 is used for signal process and generation of drive power in a circuit portion 113. A rectification circuit 112 outputs direct current or rectifies electric power to half-wave, and they are stored in a power storage portion 114. A constant-voltage circuit 116 is preferably provided to stabilize electric power supplied from the power storage portion 114 and supply the electric power to a CPU 122.

Signals demodulated by a demodulation circuit 118 include signals for controlling a sensor portion 124 and a memory portion 130, information to be stored in the memory portion 130, and the like. Moreover, a signal outputted from the sensor portion 124 and information read from the memory portion 130 is outputted to a modulation circuit 120 through the CPU 122. The modulation circuit 120 modulates this signal into a communication-enabled signal, and outputs the signal through the third antenna 110.

The sensor portion 124 includes a sensor drive circuit 126 and a sensor 128. The sensor 128 is formed of a semiconductor element such as a resistance element, a capacitive coupling element, an inductive coupling element, a photovoltaic element, a photoelectric conversion element, a thermoelectric element, a transistor, a thermistor, or a diode. The sensor driver circuit 126 detects changes in impedance, reactance, inductance, voltage, or current, and performs analog/digital (A/D) conversion to output a signal to the CPU 122.

The memory portion 130 is composed of any one or combination of the following memories: read only memory, rewritable memory, and non-volatile memory. To store a signal detected at the sensor portion 124, the memory portion 130 can be made up from Static RAM, Electrically Erasable Programmable Read-Only memory (EEPROM), or non-volatile memory that has a floating gate or a charge accumulation layer, or the like. A mask ROM or a programmable ROM may be provided in the memory portion 130, so as to be executed by the CPU 122. At this time, the CPU 122 operates so as to control the sensor portion 124 in accordance with a program stored in the memory portion 130.

The circuit portion 113 including the rectification circuit 112, the demodulation circuit 118, the modulation circuit 120, the CPU 122, the sensor portion 124, and the memory portion 130 can be realized using semiconductor integrate circuits. For example, the circuit portion 113 can be formed when a MOS transistor is formed over a single crystalline semiconductor substrate. Moreover, a transistor formed of a semiconductor film, so called thin film transistor, with a thickness of 10 nm to 200 nm also can form the circuit portion 113.

The power storage portion 114 can be formed of a secondary battery utilizing chemical reaction for charge and discharge or a capacitor accumulating electric charge. To miniaturize the second base 104 with the sensor portion 124, the power storage portion 114 is preferably formed of a multilayer ceramic capacitor or an electric double layer capacitor.

In this manner, by separating the first base 102 from the second base 104, the second base 104 including the sensor portion 124 will not be affected even when the first antenna 106 is enlarged to improve receiver sensitivity. That is, the second base 104 including the sensor portion 124 can be miniaturized; therefore, the sensor device can be used for multiple uses. For example, when the second base 104 with the sensor portion is attached to compact containers or minute capsules, the physical quantity of the contents can be detected. The third antenna 110 receives the electromagnetic waves to generate electric power, so that the electric power is stored in the power storage portion 114 of the second base 104; thus, the power storage portion 114 can be miniaturized. Further, the sensor portion 124 is operated by supplying electric power from the power storage portion 114 without external signals; therefore, the physical quantity of an object can be measured using the sensor portion 124 even in the case of no signals transmitted from outside.

Figure 2A:
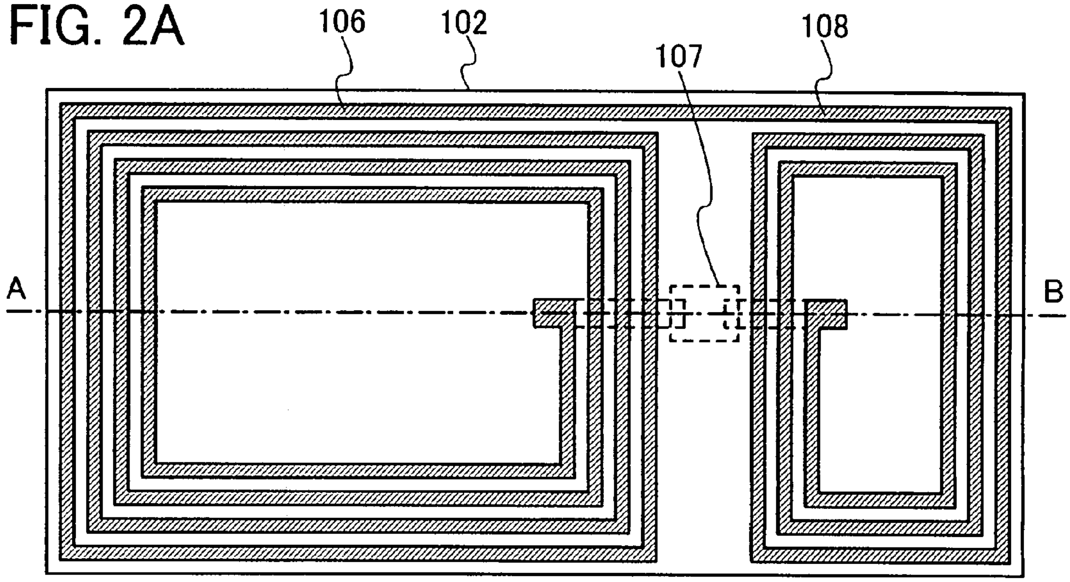
FIGS. 2A to 2D show a sensor device composed of a first base and a second base.
Figure 2B:
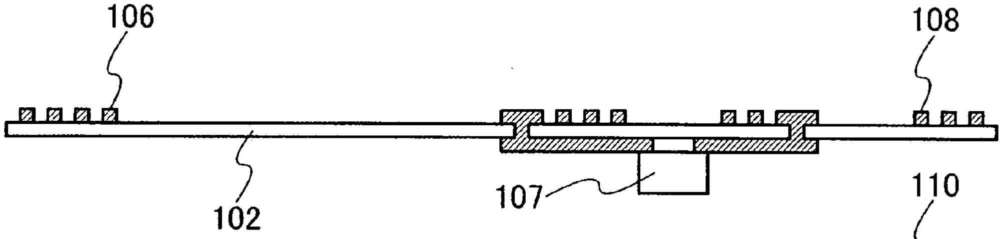
Figure 2C:
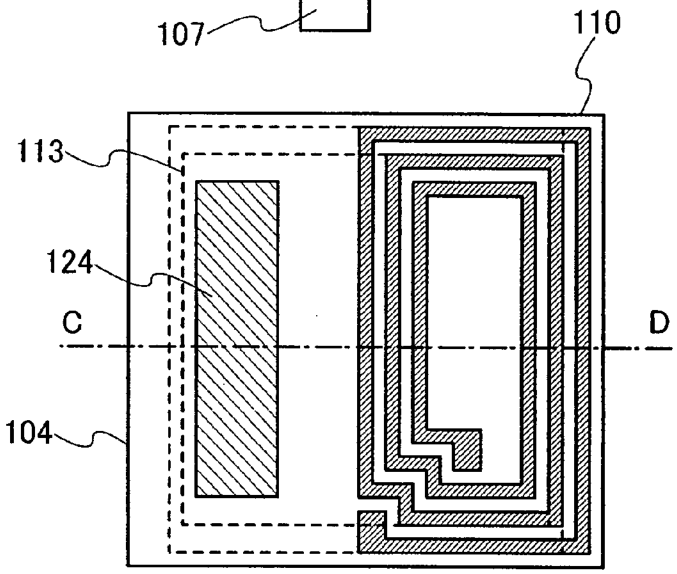
Figure 2D:
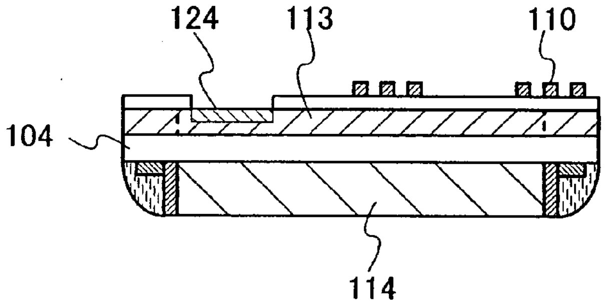

FIGS. 2A to 2D show the sensor device composed of the first base 102 and the second base 104. FIG. 2A shows a plan view of the first base 102 and FIG. 2B shows a cross-sectional structure of the first base 102 taken along the line A-B in FIG. 2A, respectively. In addition, FIG. 2C shows a plan view of the second base 104 and FIG. 2D shows a cross-sectional structure of the second base 104 taken along a line C-D in FIG. 2C respectively.

In FIG. 2A and FIG. 2B, the first base 102 is provided with the first antenna 106 and the second antenna 108. The first antenna 106 may be appropriately designed depending on a frequency band for communication. For example, as the frequency band of the electromagnetic waves, a long wave band including and up to 135 kHz, a short wave band of from 6 to 60 MHz (typically, 13.56 MHz), an ultra short wave band of from 400 to 950 MHz, a micro wave band of 2 to 25 GHz, or the like can be used. As an antenna for the long wave band or the short wave band, an antenna utilizing electromagnetic induction using a loop antenna is employed. In addition, an antenna utilizing mutual induction (electromagnetic coupling) or electrostatic induction (electrostatic coupling) may also be used. FIG. 2A and FIG. 2B show a case where the first antenna 106 and the second antenna 108 are formed of spiral antennas. One ends of the first antenna 106 and the second antenna 108 are directly connected to each other and the other ends are connected with a resonant capacitor 107 interposed therebetween.

The first antenna 106 is preferably formed of highly conductive material such as aluminum, copper, silver, or the like. For example, the first antenna 106 can be formed by a printing method such as screen-printing, offset printing, or ink-jet printing, using a paste-like composition of copper or silver paste. Alternatively, an aluminum film may be formed by sputtering or the like and processing it by etching to form the first antenna 106. The first antenna 106 may also be formed by an electrolytic plating method or an electroless plating method. The same applies to the second antenna 108. In any case, the first antenna 106 and the second antenna 108 can be formed over a base having an insulating surface such as a plastic film, a plastic base, a non-woven fabric, a sheet of paper, a glass epoxy substrate, a glass substrate, or the like. The resonant capacitor 107 is provided on the opposite side to the first antenna 106 using wires passing through the base 102. The resonant capacitor 107, for example, is formed of external components such as a chip capacitor.

In FIG. 2C and FIG. 2D, the third antenna 110 is formed over the second base 104. The circuit portion 113 is formed so as to partly overlaps with the third antenna 110 with an insulating layer interposed therebetween; thus, the circuit portion 113 is designed to be miniaturized. Moreover, the sensor portion 124 is provided over the second base 104. The power storage portion 114 may be integrated with the second base 104. Even when the power storage portion 114 is formed of a multilayer ceramic capacitor or an electric double layer capacitor, some mounting area is needed; therefore, the power storage portion 114 is preferably provided on the opposite surface where the third antenna 110 is formed in order to integrate with the second base 104.

Figure 3:
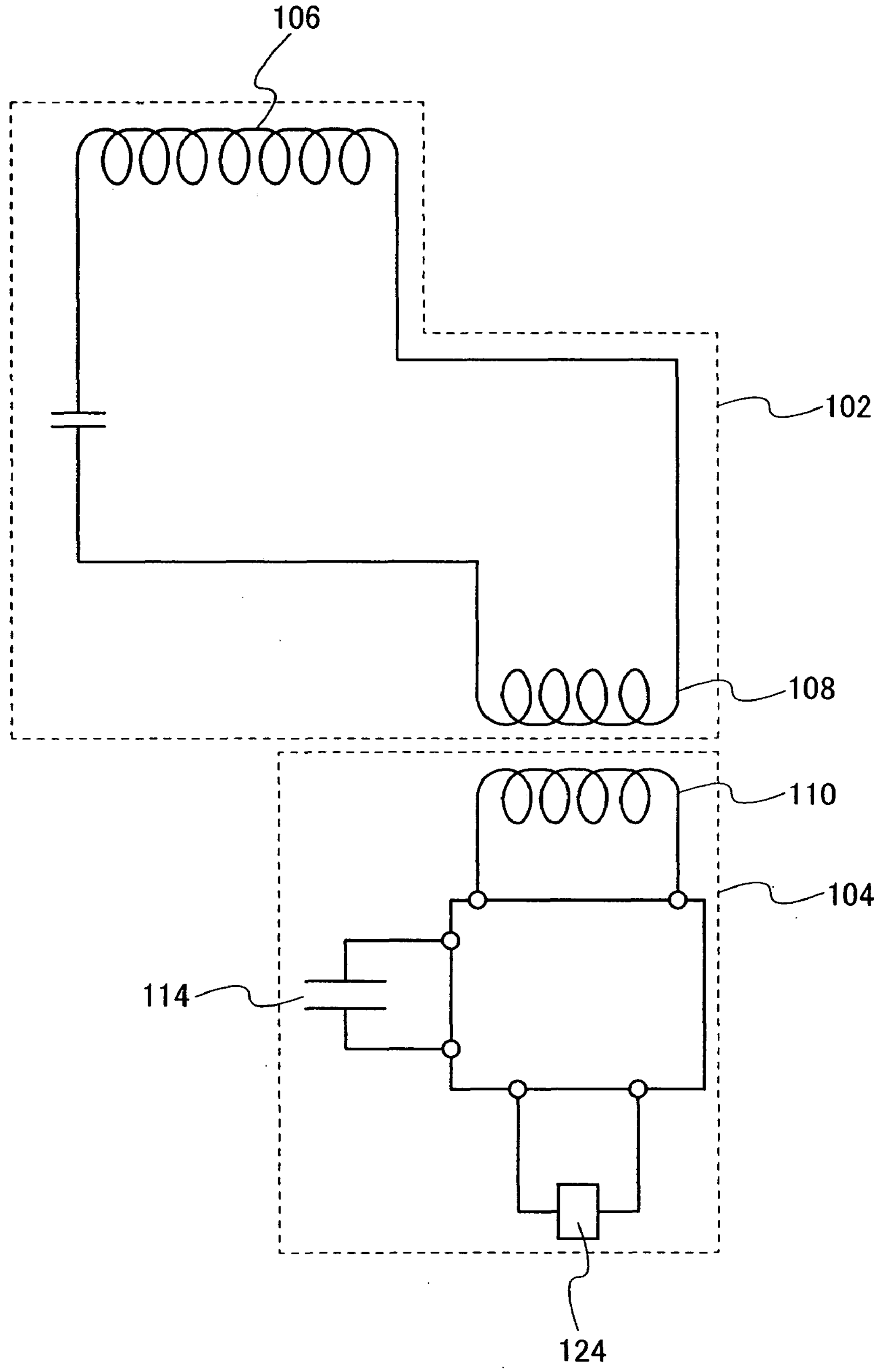
FIG. 3 is an equivalent circuit diagram of a sensor device having a first base provided with a first antenna and a second antenna, and a second base provided with a third antenna, a power storage portion, and a sensor portion.

FIG. 3 shows an equivalent circuit of the first base 102 and the second base 104. The first base 102 includes the first antenna 106 and the second antenna 108, and the second base 104 includes the third antenna 110, the power storage portion 114, and the sensor portion 124. The first base 102 and the second base 104 are separated. However, these bases operate in conjunction when the second antenna 108 and the third antenna 110 have a distance permitting electromagnetic coupling. Further, the second base 104 can solely continue operating during the power storage portion 114 being charged.

In accordance with the sensor device of this embodiment mode, provision of an antenna for receiving electromagnetic wave and a sensor portion on the different bases makes it possible to miniaturize the base having the sensor portion. In addition, electromagnetic waves are converted into electric power using the antenna and the power storage portion storing the electronic power is provided; thus, the physical quantity of a target object can be detected by active operation of the sensor. In this case, since enlargement of the antenna receiving electromagnetic waves is permitted, high gain can be achieved. Moreover, the second base including the sensor portion can be miniaturized so that the second base can be included in compact containers or minute capsules.

Embodiment Mode 2

This embodiment mode will describe another structure in which an antenna receiving electromagnetic waves and a sensor portion are provided with different bases so that a sensor device having a non-contact charge function can be miniaturized as in Embodiment Mode 1. In this embodiment mode, the sensor device, in which a first antenna receiving electromagnetic waves, a CPU, and a power storage portion are formed over a first base, and a sensor portion is provided over a second base, will be described.

Figure 4:
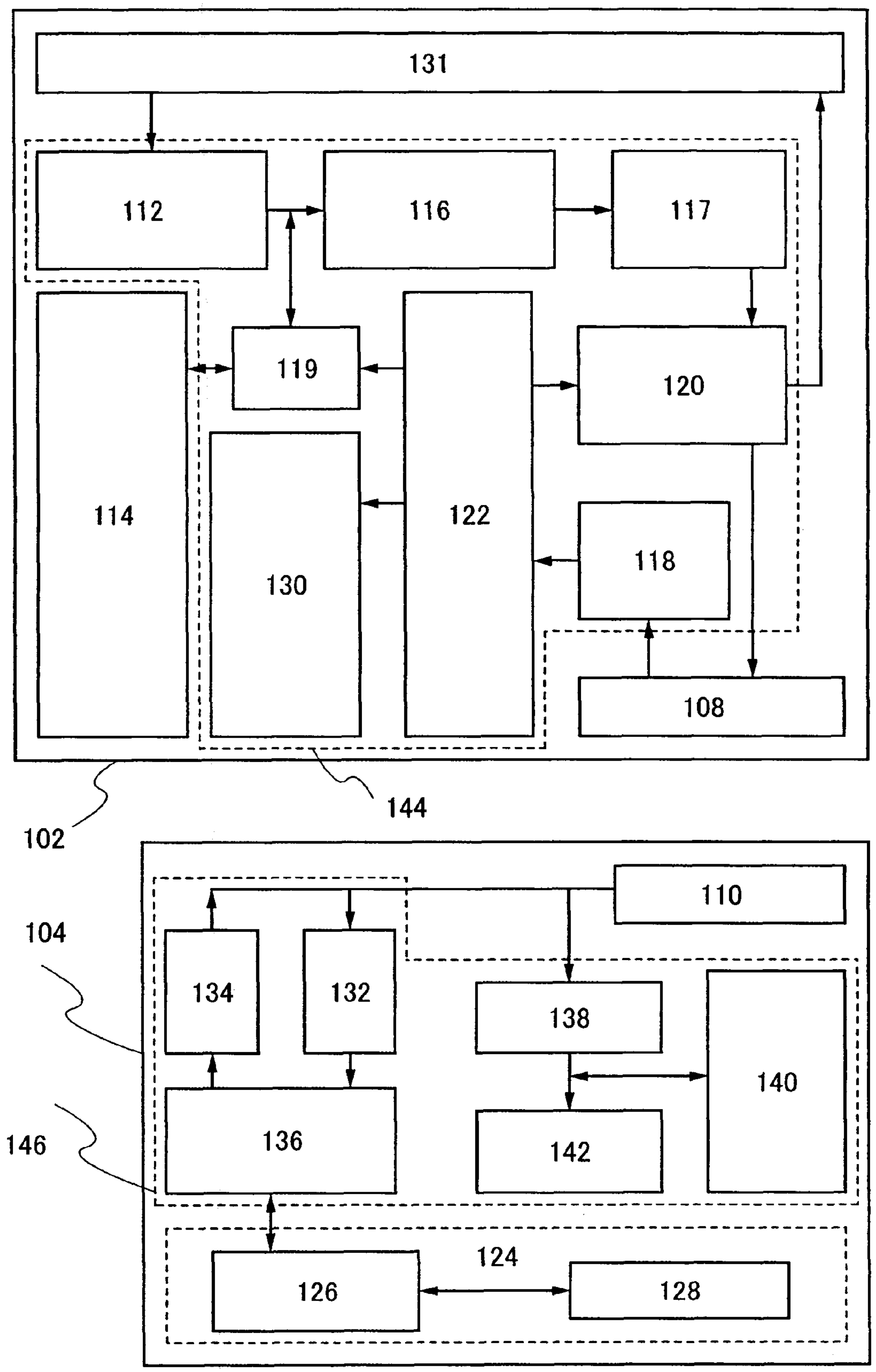
FIG. 4 shows a structure of a sensor device in accordance with Embodiment Mode 2.

FIG. 4 is a block diagram showing a structure of the sensor device in accordance with this embodiment mode. This sensor device is composed of a first base 102 and a second base 104. The first base 102 and the second base 104 are separate bases. The first base 102 has a power storage portion 114 and a circuit portion 144 of the first base. The second base 104 has a circuit portion 146 of the second base and a sensor portion 124.

A first antenna 131 receiving electromagnetic waves is provided to the first base 102. The first antenna 131 constantly receives electromagnetic waves of from a submillimeter-wave band to a very long-wave band, which propagates in the air. Alternatively, the first antenna 131 can receive electromagnetic waves transmitted from an external device. Further, electromagnetic waves transmitted from an external device or electromagnetic waves leaking from electronic device also can be received.

A part of electromotive force generated by reception of electromagnetic waves by the first antenna 131 is rectified by a rectification circuit 112 and stored in the power storage portion 114. The power storage portion 114 supplies electric power needed for the operation of a CPU 122, a memory portion 130, the sensor portion 124 of the second base 104, and the other circuits. When electromotive force given by the first antenna 131 is sufficient, the supply of electric power therefrom is given high priority. A charge and discharge control circuit 119 may be provided to stop supply of electric power from the power storage portion 114. The charge and discharge control circuit 119 is disposed between the power storage portion 114 and a constant-voltage circuit 116. With this charge and discharge control circuit 119, electric power stored in the power storage portion 114 can be used efficiently; therefore, stable time of electric power supply can be extended. The structure of the first antenna 131 and the power storage portion 114 of the first base 102 are similar to that in Embodiment Mode 1.

Electric power stored in the power storage portion 114 is supplied to the second base 104 through the constant-voltage circuit 116, an oscillation circuit 117, a module circuit 120, and a second antenna 108. The second antenna 108 and the third antenna 110 are antennas coupled electromagnetically. Induced electromotive force generated by reception of electromagnetic force by the third antenna 110 is used as electric power for the operation of the circuit portion 146 and the sensor portion 124 of the second base. A capacity portion 140 is a capacitor for storing this electric power temporally. A rectification circuit 138 outputs direct current or rectifies electric power into half-wave, and they are stored in the capacity portion 140. A constant-voltage circuit 142 is preferably provided to stabilize and supply electric power supplied from the capacity portion 140 to a control circuit 136.

Signals demodulated by a demodulation circuit 132 include a signal for controlling the sensor portion 124. In addition, a signal outputted from the sensor portion 124 is outputted to a modulation circuit 134 through the control circuit 136. The modulation circuit 134 modulates this signal into a communication-enabled signal, and the signal is transmitted to the second antenna 108 through the third antenna 110.

The sensor portion 124 includes a sensor drive circuit 126 and a sensor 128. This structure is the same as in Embodiment Mode 1.

In this manner, the second base 104 having the sensor portion 124 for measuring the physical quantity of an object can be miniaturized by providing the followings over the first base 102: the first antenna 131 receiving electromagnetic waves, the circuit portion 144 of the first base which performs signal processing of received electromagnetic waves and generation of direct current power and the like, and the power storage portion 114. For example, the second base 104 with the sensor portion is attached to compact containers or minute capsules, therefore, the physical quantity of contents can be detected. For the first base 102, a ceramic capacitor or an electric double layer capacitor, which have a large capacity, can be employed as the power storage portion 114.

Figure 5A:
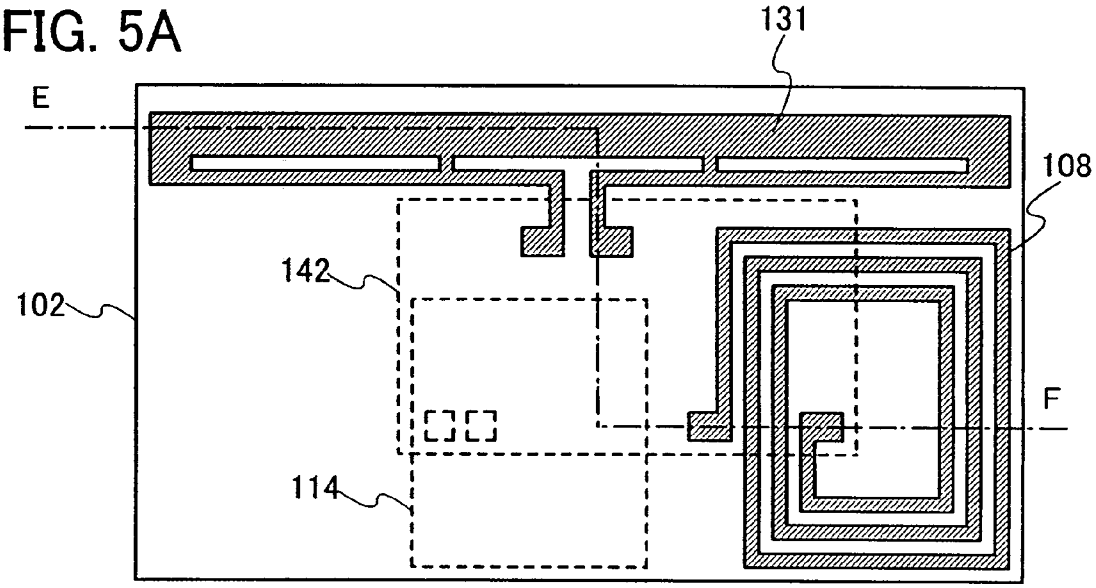
FIGS. 5A to 5D show a sensor device composed of a first base and a second base.
Figure 5B:
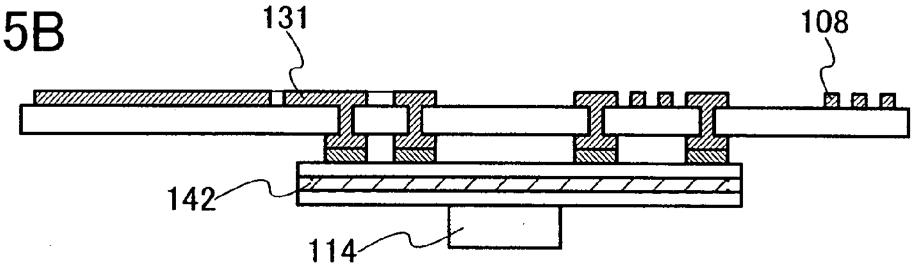

FIGS. 5A and 5B show a sensor device composed of the first base 102 and the second base 104. FIG. 5A shows a plan view of the first base 102 and FIG. 5B shows a cross-sectional structure of the first base 102 taken along the line E-F in FIG. 5A. Further, FIG. 5C shows a plan view of the second base 104 and FIG. 5D shows a cross-sectional structure of the second base 104 taken along the line G-H in FIG. 5C.

In FIG. 5A and FIG. 5B, the first base 102 is provided with the first antenna 131 and the second antenna 108. The first antenna 131 may be appropriately designed depending on a frequency band for communication. As the frequency band of the electromagnetic waves, a long wave band including and up to 135 kHz, a short wave band of from 6 to 60 MHz (typically, 13.56 MHz), an ultra short wave band of from 400 to 950 MHz, a micro wave band of from 2 to 25 GHz, or the like can be used. As an antenna for the long wave band or the short wave band, an antenna utilizing electromagnetic induction by a loop antenna is used. In addition, an antenna utilizing mutual induction (electromagnetic coupling) or electrostatic induction (electrostatic coupling) may also be used. FIG. 5A and FIG. 5B show a case where the first antenna 131 is formed of a dipole antenna and the second antenna 108 is formed of a spiral antenna.

Figure 5C:
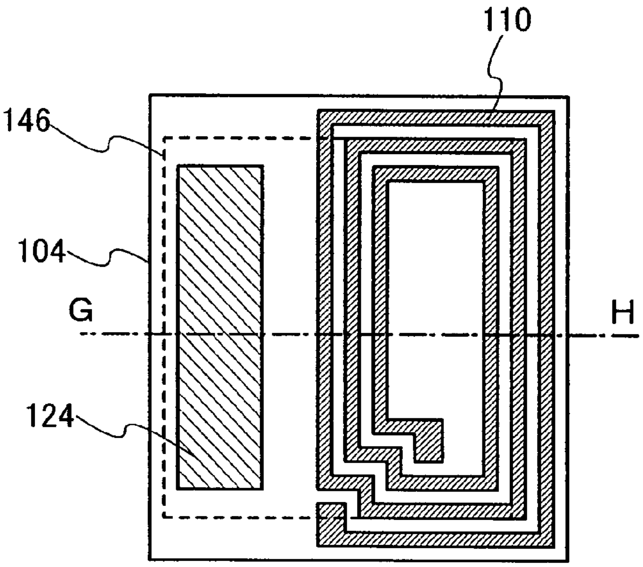
Figure 5D:
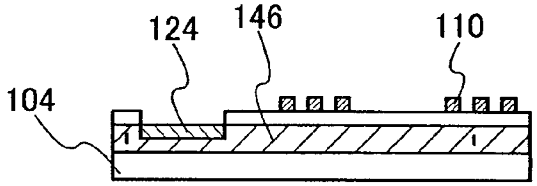

In FIG. 5C and FIG. 5D, the third antenna 110 is formed over the second base 104. The circuit portion 146 is formed so as to partly overlap with the third antenna 110 with an insulating layer interposed therebetween; thus, the circuit portion 146 is designed to be miniaturized. Moreover, the sensor portion 124 is provided over the second base 104. The structure of this second base 104 is similar to those in the Embodiment Mode 1.

Figure 6:
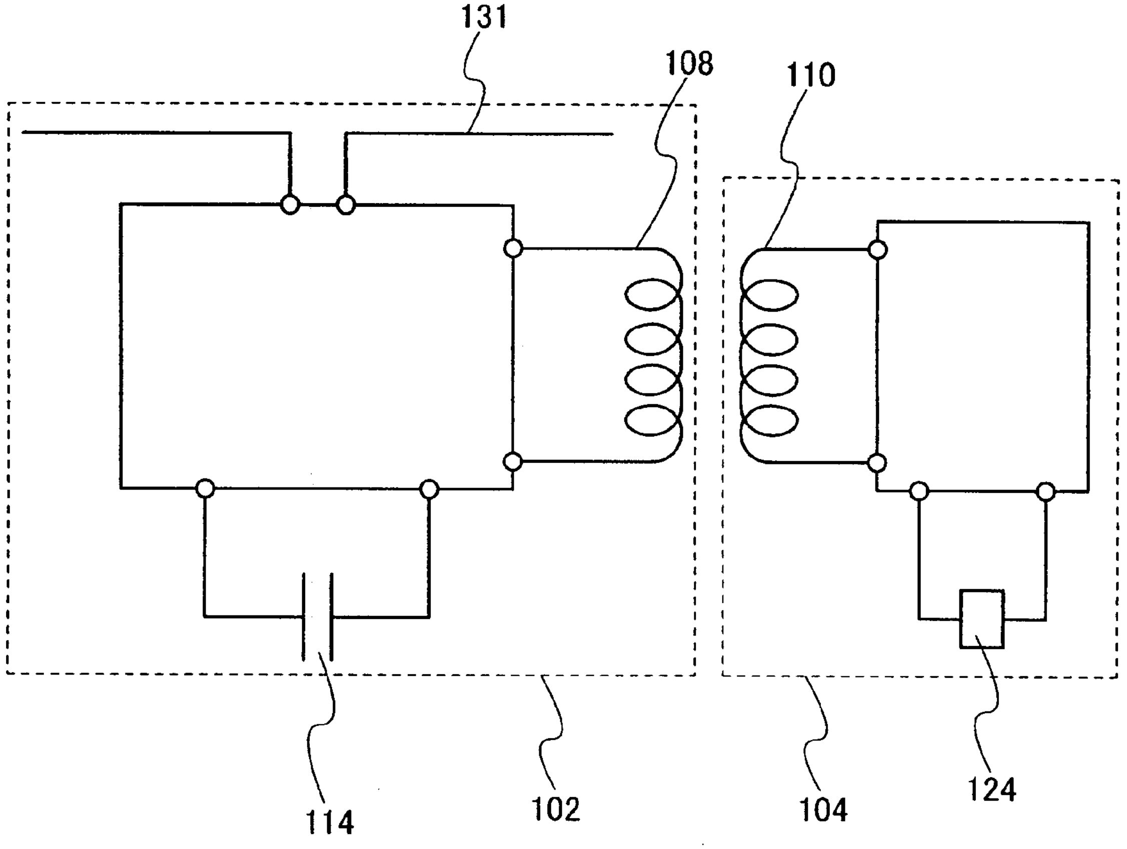
FIG. 6 is an equivalent circuit diagram of a sensor device having a first base including a first antenna, a power storage portion, and a second antenna, and a second base including a third antenna and a sensor portion.

FIG. 6 shows an equivalent circuit of the sensor device composed of the first base 102 having the first antenna 131, the power storage portion 114, the second antenna 108, and the second base 104 having the third antenna 110 and the sensor portion 124. The first base 102 and the second base 104 are separated. However, these bases operate in conjunction when the second antenna 108 and the third antenna 110 have a distance for electromagnetic coupling. In addition, when electric power is stored in the power storage portion 114, the first base 102 can supply the electric power to the second base 104 therefrom.

In accordance with the sensor device of this embodiment mode, provision of an antenna for receiving electromagnetic waves and a power storage portion over the different bases makes it possible to miniaturize the base having the sensor portion. In addition, electromagnetic waves are converted into electric power using the antenna and the power storage portion for storing the electronic power is provided; thus, the physical quantity of a target object can be detected by active operation of the sensor. In this case, enlargement of the antenna for receiving electromagnetic waves is permitted, high gain can be achieved. Moreover, the second base including the sensor portion can be miniaturized so that the second base can be included in compact containers or minute capsules.

Embodiment Mode 3

Figure 7:
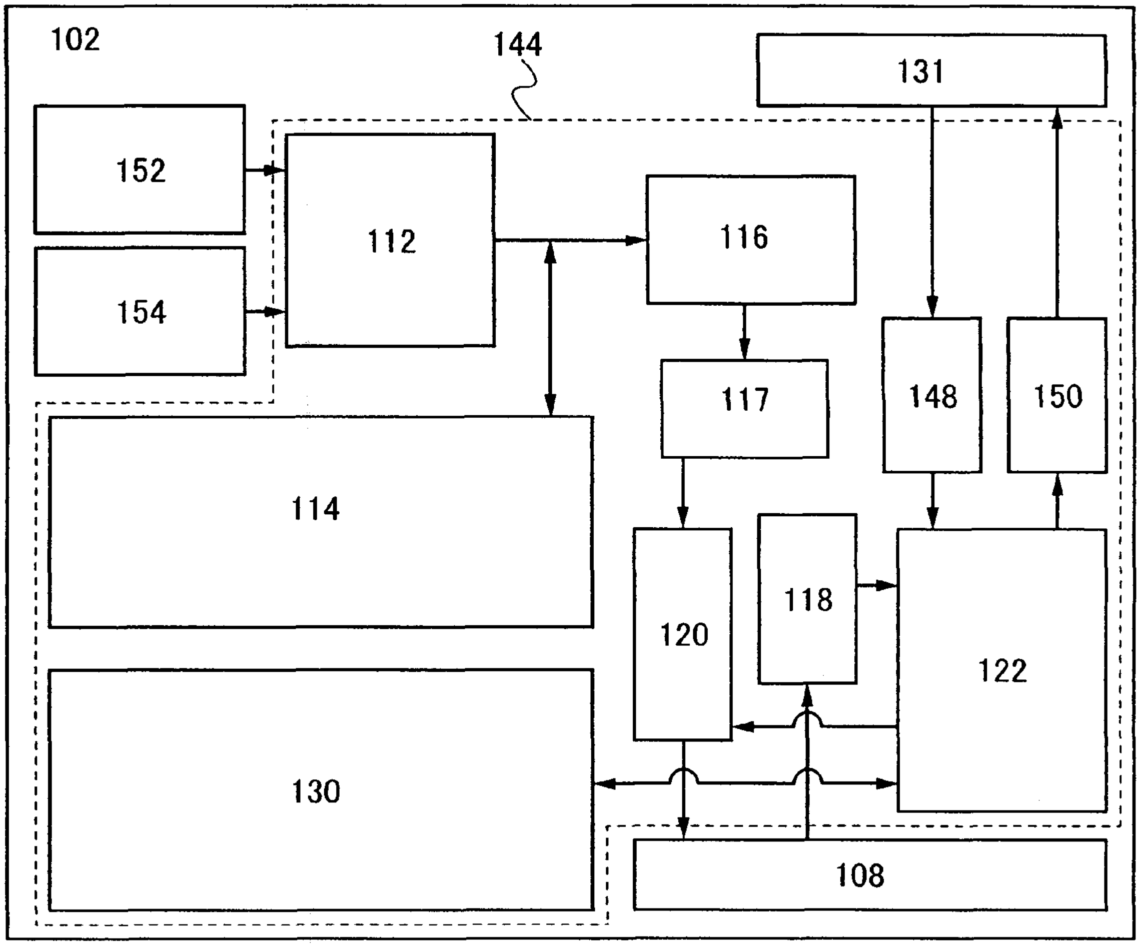
FIG. 7 shows a structure of a sensor device including plural antennas in accordance with Embodiment Mode 3.
Figure 8:
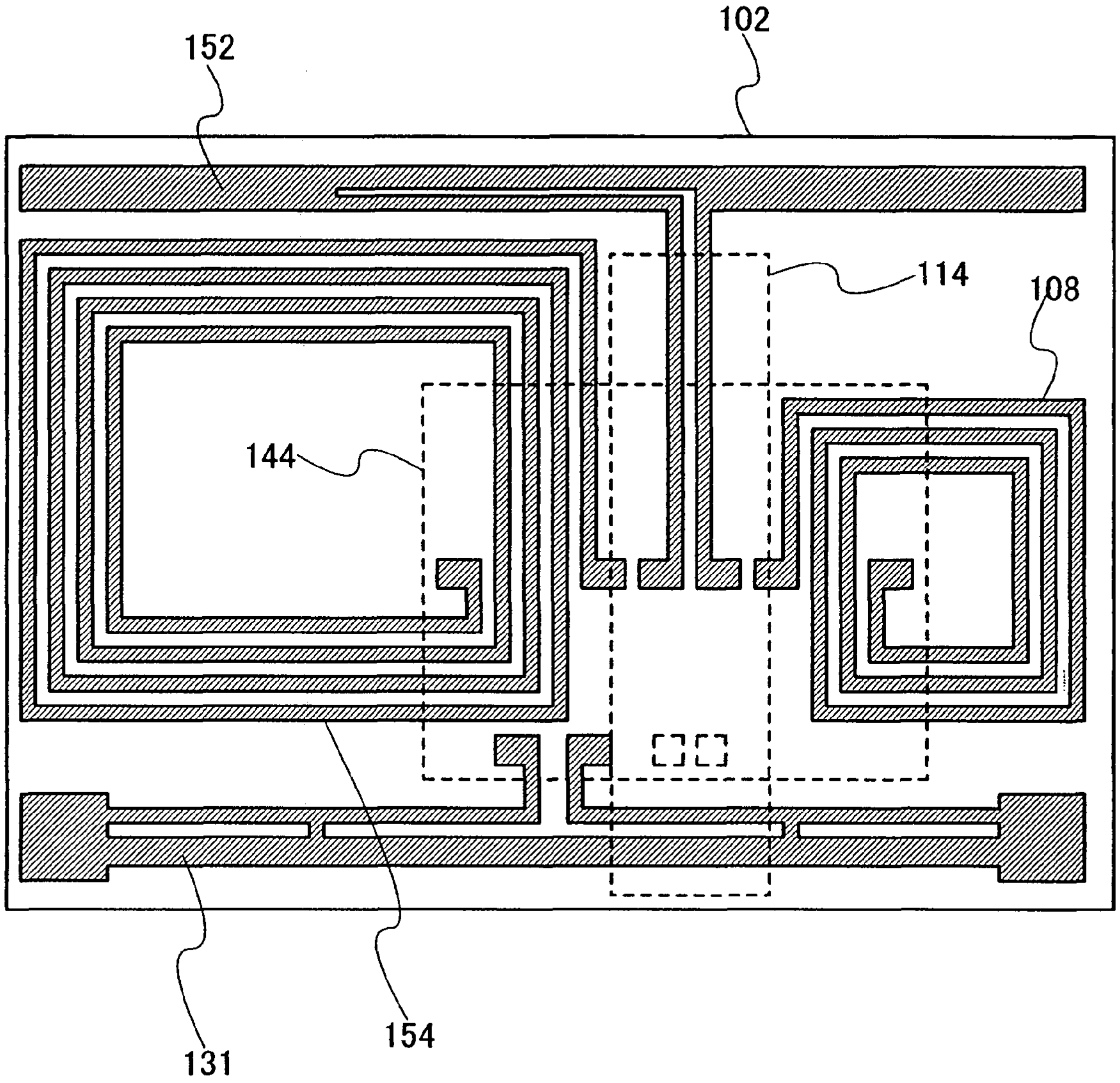
FIG. 8 shows a structure of a sensor device including plural antennas in accordance with Embodiment Mode 3.

This embodiment mode will describe an example of a first base 102 that has a different mode from Embodiment Mode 2 with reference to FIG. 7 and FIG. 8. This embodiment mode shows an example of a sensor device having plural antennas to receive wide bands of electromagnetic waves and store electric power.

In a first base 102 described in FIG. 7, a circuit portion 144 of the first base includes components such as a rectification circuit 112, a constant-voltage circuit 116, an oscillation circuit 117, a demodulation circuit 118, a modulation circuit 120, a CPU 122, and a memory portion 130. A structure of the circuit portion 144 has functions similar to those in FIG. 4.

A first antenna 131 is used for transmission/reception of control commands or communication data, to/from an external device. A demodulation circuit 148 and a modulation circuit 150, which are connected to the first antenna 131 are circuits performing modulation/demodulation of control demands or communication data. A second antenna 108 is an antenna electromagnetically coupled to an antenna of a second base. The first base includes plural antennas for receiving electromagnetic waves and charging a power storage portion. A first charge antenna 152 and a second charge antenna 154 are connected to a rectification circuit 112 to charge the power storage portion 114 with induced electromotive force. Each of the first charge antenna 152 and the second charge antenna 154 is designed to receive electromagnetic waves of different frequency bands. Alternatively, the first charge antenna 152 and the second charge antenna 154 are designed to have different structures to accommodate various transmission media types such as electromagnetic coupling type, electromagnetic induction type, microwave type, electrostatic coupling type, or the like. In any case, by providing plural charge antennas, wide frequency bands of electromagnetic waves of from 10 MHz to 6 GHz can be received and the charge function can be improved.

FIG. 8 shows a structure of the first base 102. In FIG. 8, the first antenna 131, the second antenna 108, the first charge antenna 152, and the second charge antenna 154 are formed over the first base 102. The first charge antenna 152 is formed to have a shape of a dipole antenna, and receives electromagnetic waves of UHF band (868 MHz, 915 MHz, and 950 MHz). The second charge antenna 154 is formed to have a shape of a spiral antenna, and receives electromagnetic waves of 13 MHz. In addition, an antenna receiving radio waves of microwave band (2 GHz to 5 GHz) may be added to the first base 102. These antennas can be formed on an insulating film, the first base 102, by a printing method or the like. In this manner, plural antennas are used as charge antennas to receive electromagnetic waves of a plurality of frequency bands; thus, electromagnetic waves propagating in the air can be received effectively and charge capability can be improved.

A connection between the aforementioned antennas and the circuit portion 144 of the first base provided with the power storage portion 114, and a relationship between the antennas and the second base having the sensor portion are similar to those in Embodiment Mode 2.

According to this embodiment mode, by providing plural charge antennas over the first base, wide bands of electromagnetic waves can be received and it can be stored in the power storage portion. Therefore, supplying sufficient electric power to the second base with the sensor portion 124 can be realized. In this case, the second base having the sensor portion also can be miniaturized.

Embodiment Mode 4

Figure 9:
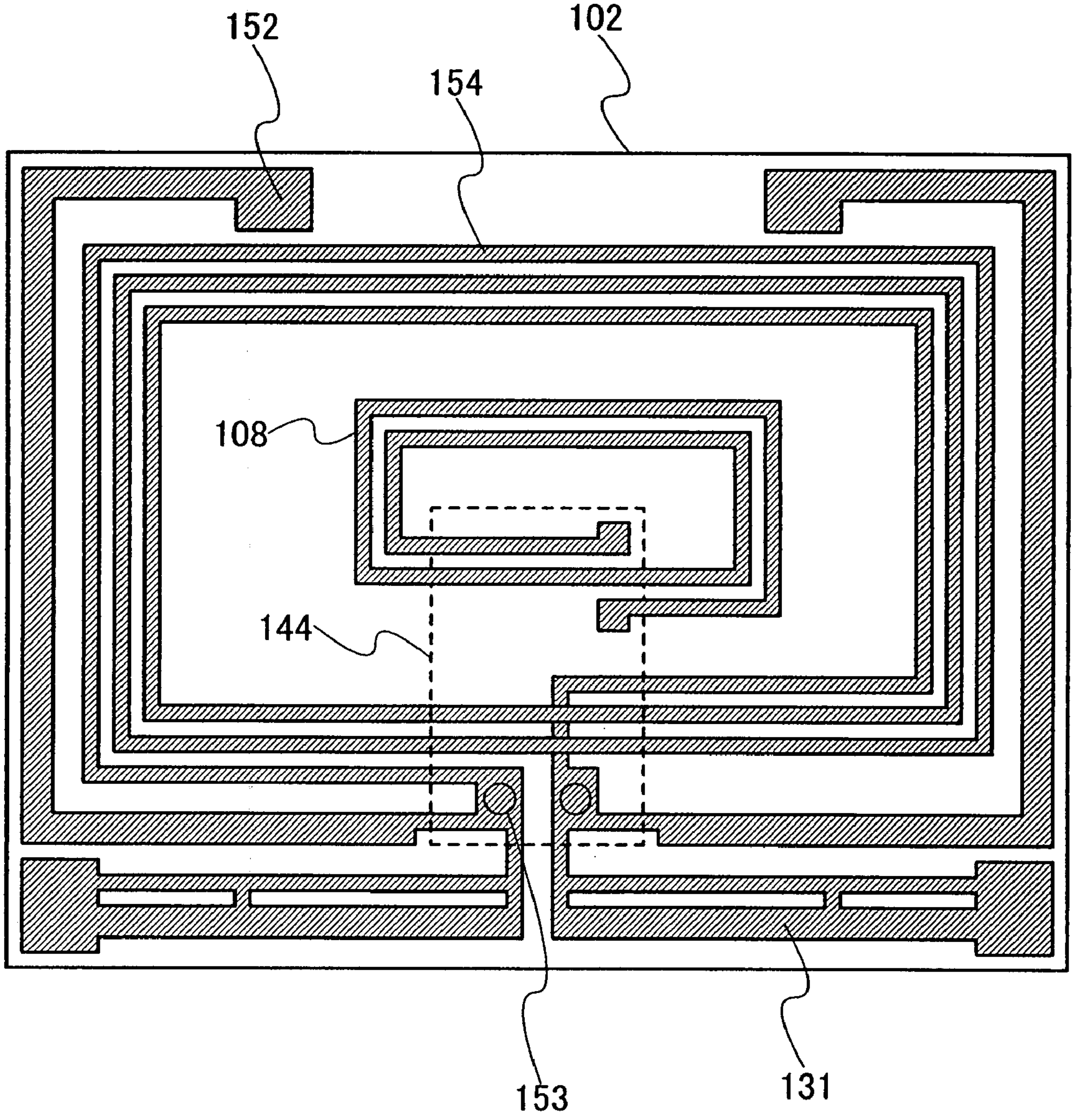
FIG. 9 shows a structure of a sensor device including plural antennas in accordance with Embodiment Mode 4.

This embodiment mode will describe, in a sensor device having plural antennas, a different mode of antenna structures with reference to FIG. 9.

FIG. 9 shows a structure of an antenna of the first base 102. A first antenna 131 used for transmission/reception of control commands or communication data, to/from an external device, a first charge antenna 152, and a second charge antenna 154 are joined together, and these antennas are connected to a circuit portion 144 of a first base at a common contact portion 153. The second antenna 108 forms a contact with the circuit portion 144 of the first base at another place.

In mounting plural charge antennas over the first base 102, when contact portions that touch the circuit portion 144 of the first base are provided on each antenna, the area occupied by the contact portions limits circuit arrangement of the circuit portion 144 of the first base. Such limitation can be avoided by sharing a connection portion of plural antennas and the circuit portion.

Other structures are similar to those in Embodiment Mode 3. By providing plural charge antennas over the first base permits receiving electromagnetic waves of wide bands and storing electric power in the storage portion, whereby supplying sufficient electric power to the second base having the sensor portion 124 can be realized. In this case, the second base having the sensor portion 124 also can be miniaturized.

Embodiment Mode 5

This embodiment mode will describe an example of a transistor structure which can form a circuit portion in any of Embodiment Modes 1 to 4.

Figure 10:
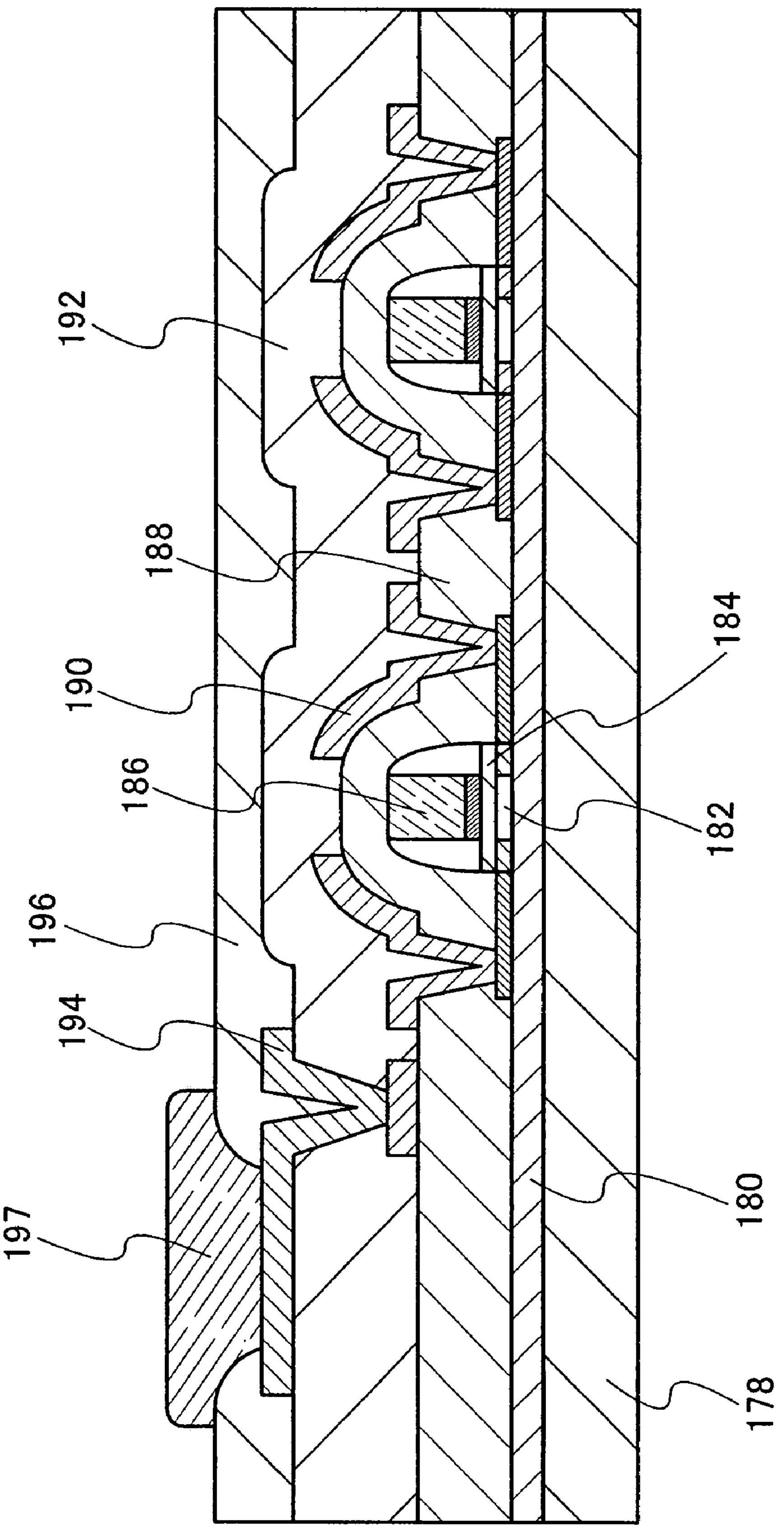
FIG. 10 shows a structure of transistors, which can form a circuit portion in any of Embodiment Modes 1 to 4.

FIG. 10 shows a thin film transistor formed over a substrate 178 having an insulating surface. As the substrate 178, a glass substrate such as an aluminosilicate glass, a quartz substrate, or the like can be employed. The thickness of the substrate 178 is 400 μm to 700 μm. The substrate 178 may be thinned to 5 μm to 100 μm by grinding.

A first insulating layer 180 may be formed of silicon nitride or silicon oxide on the substrate 178. The first insulating layer 180 stabilizes characteristics of the thin film transistor. A semiconductor layer 182 is preferably polycrystalline silicon. Alternatively, the semiconductor layer 182 may be a single crystalline silicon thin film, of which a grain boundary does not affect drift of carriers in a channel formation region overlapping with a gate electrode 186.

In addition, another structure in which the substrate 178 is formed of a silicon semiconductor and the first insulating layer 180 is formed of silicon oxide can be employed. In this case, the semiconductor layer 182 can be formed of single crystalline silicon. In other words, an SOI (silicon on insulator) substrate can be employed.

The gate electrode 186 is formed over the semiconductor layer 182 with the gate insulating layer 158 interposed therebetween. Side walls may be formed on both sides of the gate electrode 186, and a lightly doped drain may be formed in the semiconductor layer 182 owing to the formation of the side walls. A second insulating layer 188 is formed of silicon oxide, silicon oxynitride, or the like. The second insulating layer is a so-called interlayer insulating layer and a first wiring 190 is formed thereover. The first wiring 190 forms a contact with a source region and a drain region, which are formed in the semiconductor layer 182.

A third insulating layer 192 and a second wiring 194 is formed of silicon nitride, silicon oxynitride, silicon oxide, or the like. In FIG. 10, the first wiring 190 and the second wiring 194 are shown, but the number of wirings to be stacked may be set as appropriate in accordance with a circuit structure. As for a wiring structure, an embedded plug may be formed by selective growth of tungsten in a contact hole, or a copper wiring may be formed by a damascene process.

An antenna layer 197 is formed over the substrate 178. The antenna layer 197 is preferably formed by a printing method or a plating method, using copper or silver to decrease resistance thereof. The antenna layer 197 may form an antenna itself or may be a connection terminal for connecting to an antenna formed over the other base. In any case, a fourth insulating layer 196 is preferably formed around the antenna layer 197 in order not to short out with the second wiring 194. The fourth insulating layer 196 is preferably formed of silicon oxide applied by coating in order to planarize the surface.

The circuit portion and the sensor portion in any of Embodiment Modes 1 to 4 can be realized using a transistor, an antenna layer, and a wiring connected thereto, which are described in this embodiment mode.

Embodiment Mode 6

This embodiment mode will describe another structure of a transistor which can form the circuit portion in any of Embodiment Modes 1 to 4. Note that elements having similar functions to those in Embodiment Mode 5 are denoted by the same reference numerals.

Figure 11:
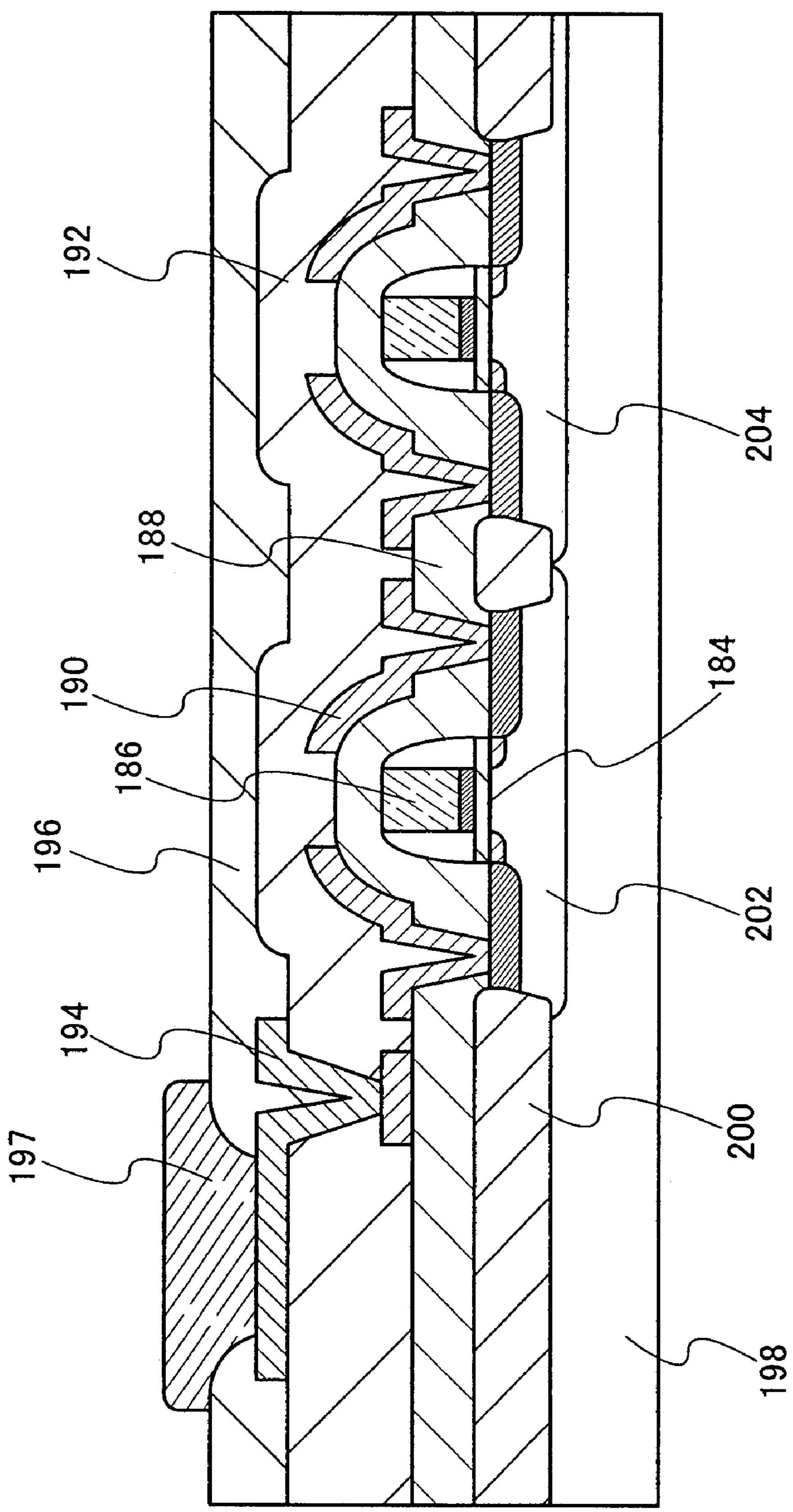
FIG. 11 shows a structure of transistors, which can form a circuit in any of Embodiment Modes 1 to 4.

FIG. 11 shows a MOS (Metal Oxide Semiconductor) transistor which is formed on a semiconductor substrate 198. As the semiconductor substrate 198, a single crystalline substrate is typically employed. The thickness of the semiconductor substrate 198 is 100 μm to 300 μm. Alternatively, the semiconductor substrate 198 may be thinned to 10 μm to 100 μm by grinding. This is because mechanical strength thereof can be maintained by combining the first base with the second base.

An element isolation-insulating layer 200 is formed on the semiconductor substrate 198. The element isolation-insulating layer 200 can be formed using a LOCOS (Local Oxidation of Silicon) technique, in which a mask such as a nitride film is formed on the semiconductor substrate 198 and is thermally oxidized to be an oxide film for element isolation. Alternatively, the element isolation-insulating layer 200 may be formed by forming a groove in the semiconductor substrate 198 using a STI (Shallow Trench Isolation) technique, embedding an insulating film in the groove, and planarizing the insulating film. In the STI technique being used, the element isolation-insulating layer 200 can have a steep side surface; therefore, the distance between isolating elements can be reduced.

An n-well 202 and a p-well 204 are formed in the semiconductor substrate 198, such that an n-channel transistor and a p-channel transistor may have a so-called double-well structure. Alternatively, a single-well structure may be used. The gate insulating layer 184, the gate electrode 186, the second insulating layer 188, the first wiring 190, the third insulating layer 192, the second wiring 194, the antenna layer 197, and the fourth insulating layer 196 are similar to those in Embodiment Mode 5.

In such a manner, when an integrated circuit is formed using a MOS transistor, a circuit portion which operates on receiving of a communication signal in an RF band (typically, 13.56 MHz) to a microwave band (typically, 2.45 GHz) can be formed.

Embodiment Mode 7

Figure 12:
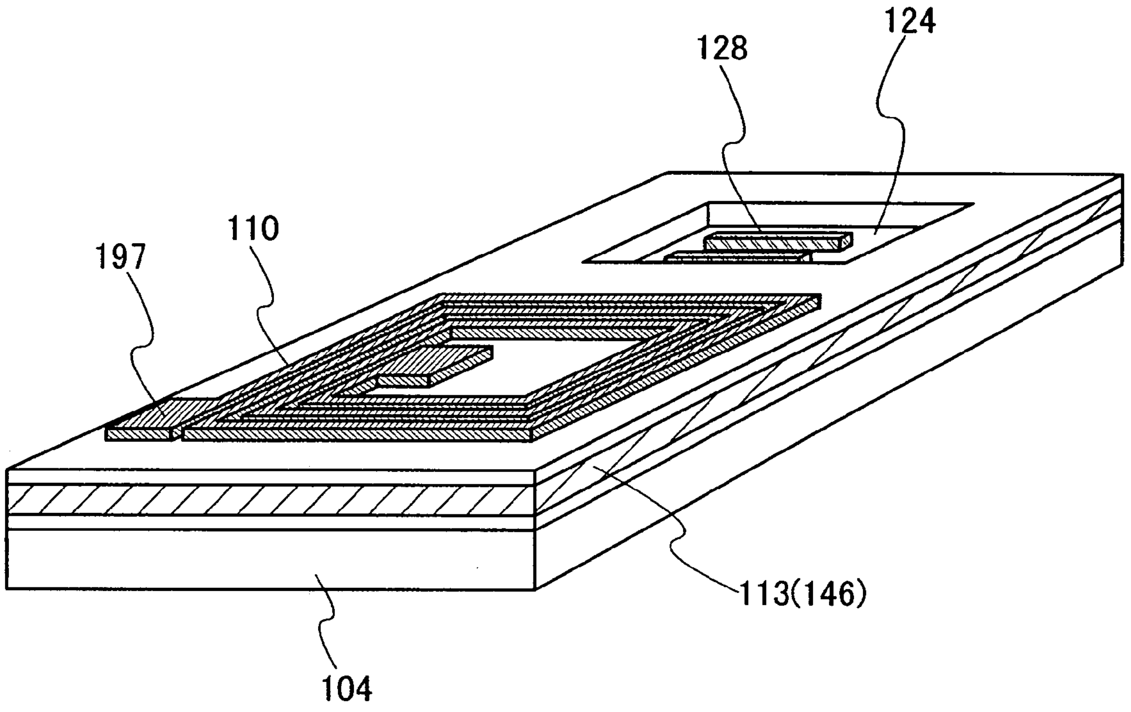
FIG. 12 shows a perspective view of a second base in any of Embodiment Modes 1 to 4.

FIG. 12 shows a perspective view of the second base 104 in any of Embodiment Modes 1 to 4. The circuit portion 113 (or the circuit portion 146 of the second base) is formed using the transistor of either Embodiment Mode 5 or 6. The third antenna 110 is formed on the second base 104, which is so-called an on-chip antenna. A protective film can be formed of an organic insulating material or an inorganic insulating material over the third antenna 110. In addition, the sensor portion 124 is provided. In the sensor portion 124, there is a case where a light introducing window or an electrode for measuring electrostatic capacitance may be provided, so that the sensor 128 can expose to measure the physical quantity of an object.

In this a manner, when the circuit portion 113 (or the circuit portion 146 of the second base) and the third antenna 110 are integrated, the second base 104 having the sensor portion 124 can be designed to be miniaturized.

Embodiment Mode 8

This embodiment mode will describe an example of the sensor portion included in any of Embodiment Modes 1 to 4 and 7.

Figure 13:
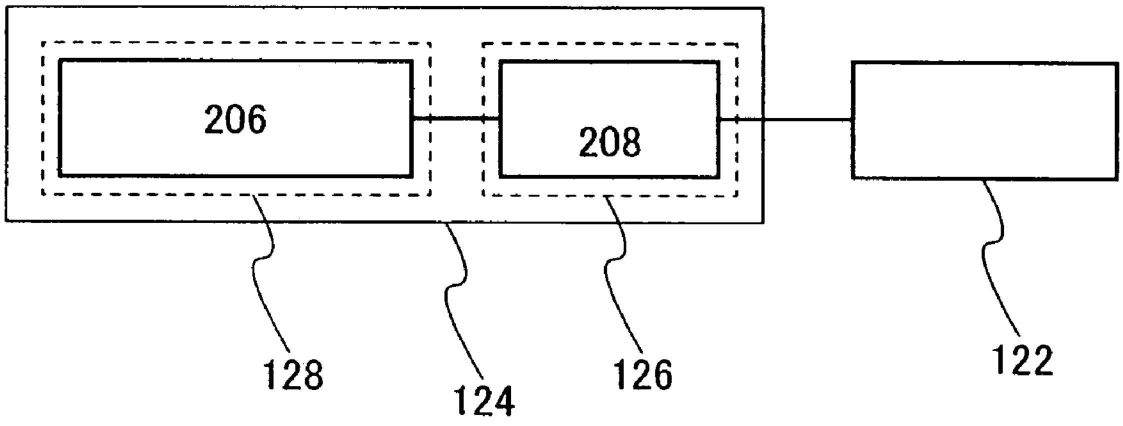
FIG. 13 is a diagram illustrating an example of a sensor portion provided over a second base.

FIG. 13 shows a structure of the sensor portion detecting temperature. The sensor 128 is formed of plural stages of ring oscillators 206 using a transistor. The sensor 128 utilizes the fact that the oscillation frequency of the ring oscillator 206 changes depending on temperature. Threshold voltage of the transistor decreases with increase of temperature; therefore, on-current is increased. The ring oscillator 206 has a characteristic that the higher the on-current of the transistor is, the higher the oscillation frequency becomes. With the use of this characteristic, the ring oscillator 206 can be used as a temperature sensor. The oscillation frequency of the ring oscillator 206 can be measured by a pulse counter 208 of the sensor driver circuit 126. A signal of the pulse counter 208 may be outputted to the CPU 122 directly or after being boosted into a logic voltage.

Figure 14A:
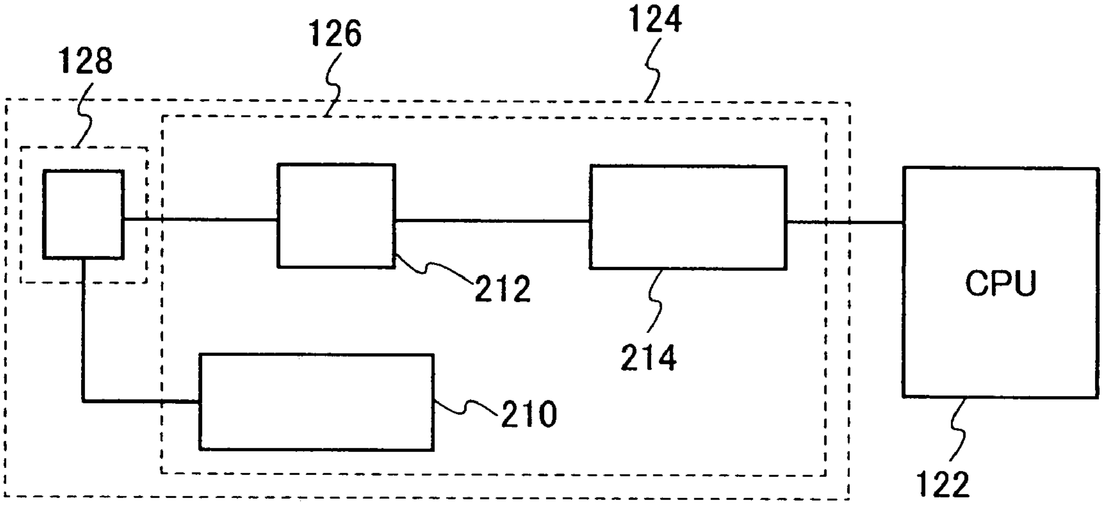
FIGS. 14A and 14B are diagrams illustrating an example of a sensor portion provided over a second base.

FIG. 14A shows an example of a sensor that detects surrounding luminance or the presence or absence of light. The sensor 128 is formed of a photodiode, a phototransistor, or the like. The sensor drive circuit 126 includes a sensor drive portion 210, a detecting portion 212, and an A/D conversion portion 214.

Figure 14B:
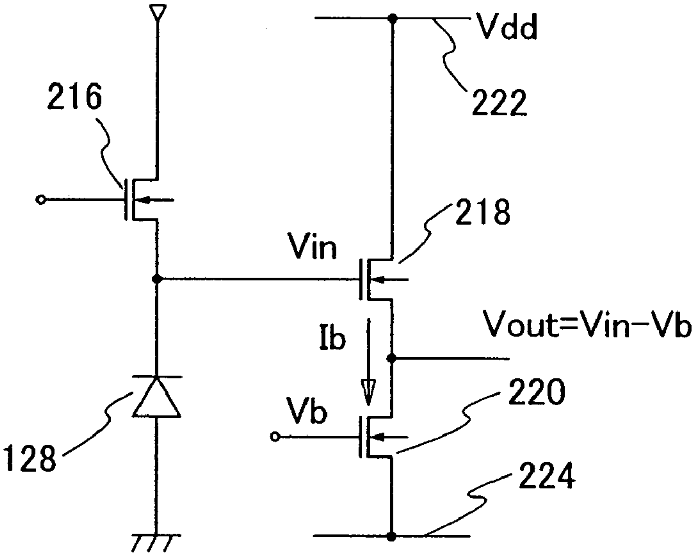

FIG. 14B is a circuit diagram for explaining the detecting portion 212. When a reset transistor 216 is made conducting, reverse bias voltage is applied to the sensor 128. Here, operation in which potential of a minus terminal of the sensor 128 is charged to the potential of power supply voltage is referred to as “reset”. After that, the reset transistor 216 is made non-conducting. At this time, the potential state is changed by an electromotive force of the sensor 128 with the passage of time. That is to say, the potential of the minus terminal of the sensor 128 that has been charged to the potential of the power supply voltage is gradually decreased by electric charge generated by photoelectric conversion. When a bias transistor 220 is made conducting state after a certain period of time has passed, a signal is output to an output side through an amplifying transistor 218. In this case, the amplifying transistor 218 and the bias transistor 220 operate as a so-called source follower circuit.

In FIG. 14B, the example in which the source follower circuit is formed of an n-channel transistor is shown; however, needless to say, the source follower circuit can also be formed of a p-channel transistor. Power supply voltage Vdd is applied to an amplifying side power supply line 222. Reference Potential 0 V is applied to a bias side power supply line 224. A drain terminal of the amplifying transistor 218 is connected to the amplifying side power supply line, and a source terminal is connected to a drain terminal of the bias transistor 220.

The source terminal of the bias transistor 220 is connected to the bias side power supply line 224. Bias voltage Vb is applied to a gate terminal of the bias transistor 220 and bias current Ib flows to this transistor. The bias transistor 220 basically operates as a constant current source. Input voltage Vin is applied to a gate terminal of the amplifying transistor 218, and a source terminal serves as an output terminal. The input-output relationship of this source follower circuit is defined as Vout=Vin−Vb. This output voltage Vout is converted into a digital signal by the A/D conversion circuit portion 214. The digital signal is outputted to the CPU 122.

Figure 15:
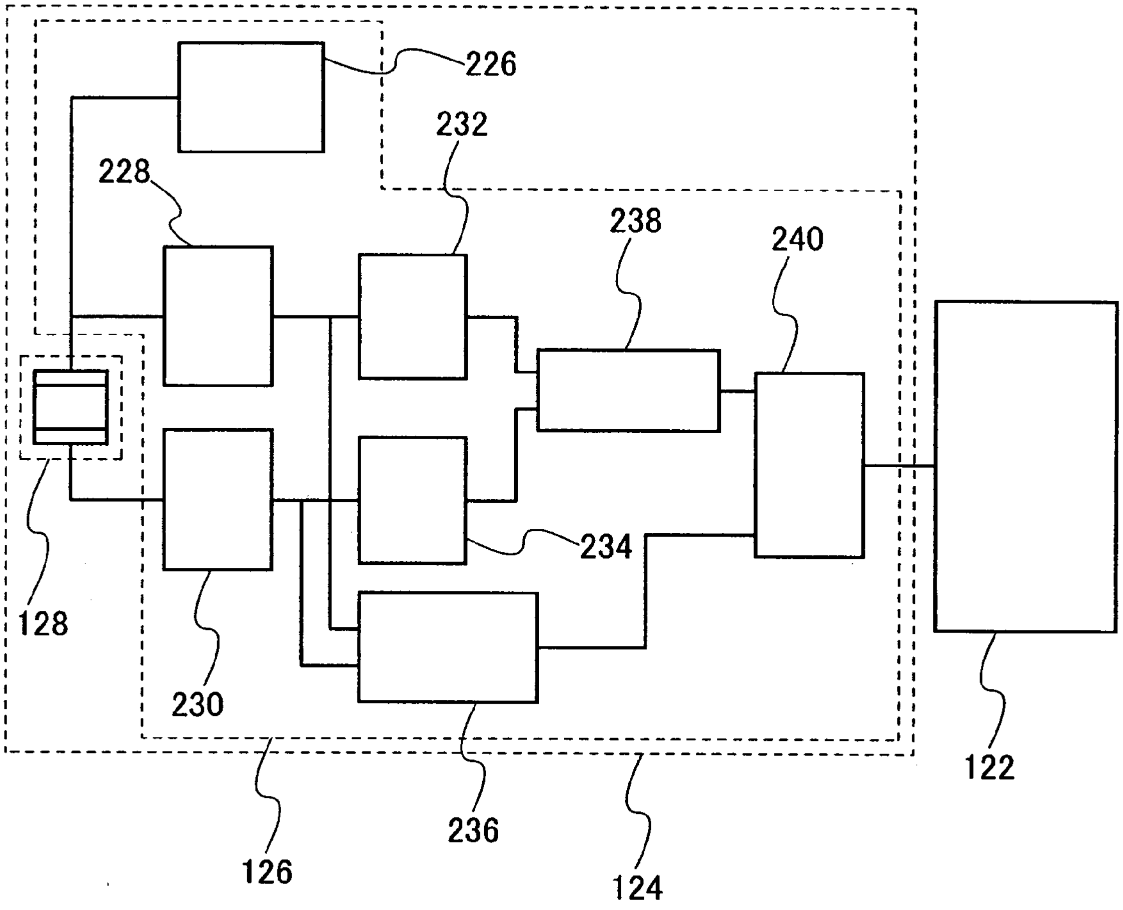
FIG. 15 is a diagram illustrating an example of a sensor portion provided over a second base.

FIG. 15 shows an example in which an element detecting electrostatic capacitance is provided in the sensor 128. The element detecting the electrostatic capacitance is provided with a pair of electrodes. A portion between the electrodes has a target object such as liquid or gas that is detected. By detecting of the change in the electrostatic capacitance between the pair of electrodes, for example, states of the contents in airtight containers are determined. In addition, polyimide, acrylic, or other hygroscopic dielectrics are interposed between the pair of electrodes and a small change in electric resistance is read; therefore, the change in humidity can be detected.

The sensor drive circuit 126 has a structure shown below. A pulse generator 226 generates a measurement reference signal and inputs the signal to an electrode of the sensor 128. Voltage at this time is also inputted to a voltage detecting circuit 228. A reference signal detected by the voltage detecting circuit 228 is converted into a voltage signal indicating an effective value by a conversion circuit 232. Current flowing between electrodes of the sensor 128 is detected by a current detecting circuit 230.

A signal detected by the current detecting circuit 230 is converted into a current signal indicating an effective value by a conversion circuit 234. The voltage signal which is the output of the conversion circuit 232 and the current signal which is the output of the conversion circuit 234 are arithmetically processed, which is performed by an arithmetic circuit 238, so that an electric parameter such as impedance or admittance is calculated. In addition, the output of the voltage detecting circuit 228 and the output of the current detecting circuit 230 are inputted to a phase comparison circuit 236. The phase comparison circuit 236 outputs the phase difference between the two signals to an arithmetic circuit 240. The arithmetic circuit 240 calculates electrostatic capacitance with the use of the output signals of the arithmetic circuit 238 and the phase comparison circuit 236. Then, the signal of electrostatic capacitance is inputted to the CPU 122.

Such a sensor and a sensor drive circuit can be realized by the transistor of either of Embodiment Mode 5 or 6. For example, with the transistor of Embodiment Mode 5, the sensor drive circuit 126 and the sensor 128 can be formed over an insulating substrate made of glass and the like.

Embodiment Mode 9

This embodiment mode will describe containers including the sensor devices in accordance with the present invention. These containers are aimed to measure the physical quantity of contents without opening the containers.

Figure 16A:
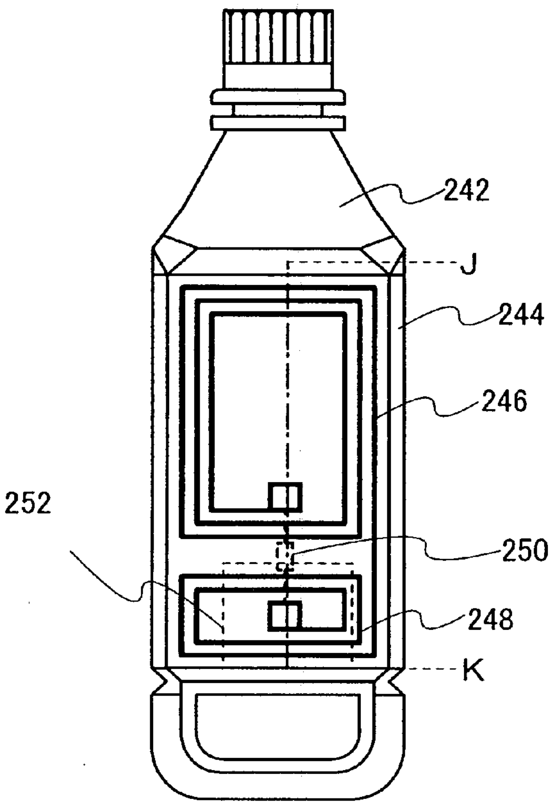
FIGS. 16A and 16B show a structural example in which a sensor device is provided on a container.
Figure 16B:
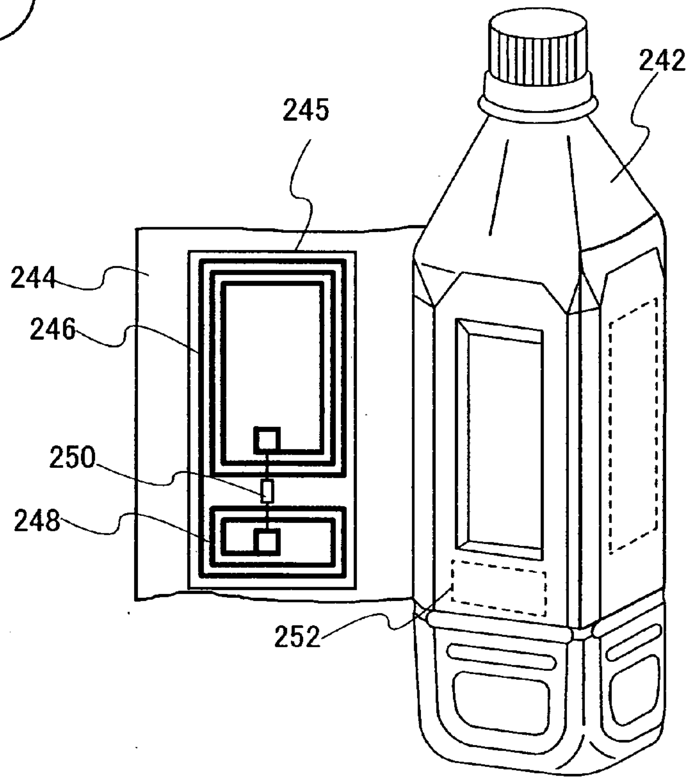

FIG. 16A and FIG. 16B show an example of a structure in which a sensor device is provided with a main body 242, like PET bottles, made of plastics or glass. Note that FIG. 16A shows an appearance of the main body 242 and FIG. 16B shows an open-state of a label 244 of the main body 242.

The label 244 for indicating trade names, contents, manufacturers, and the like is attached to the main body 242. On the surface or the other surface of the label 244, a first antenna 246 and a second antenna 248 are provided. For example, as shown in Embodiment Mode 1, the first antenna 246 and the second antenna 248 are electrically connected. In this case, one ends of the first antenna 246 and the second antenna 248 are directly connected to each other and the other ends are connected with a resonant capacitor 250 interposed therebetween.

The first antenna 246 and the second antenna 248 may be formed over a first base 245 and it may be attached to the label 244. In this case, the first base 245 can be thinned using a flexible substrate like a plastic film. Accordingly, incompatibility can be removed even when the first base 245 is attached to the label 244. In addition, the first antenna 246 and the second antenna 248 may be directly formed on the label 244. A second base 252 provided with a sensor portion is disposed on an inner side of the main body 242. This second base 252 includes components similar to those of the circuit portion 113 and the power storage portion shown in FIG. 1.

Figure 17:
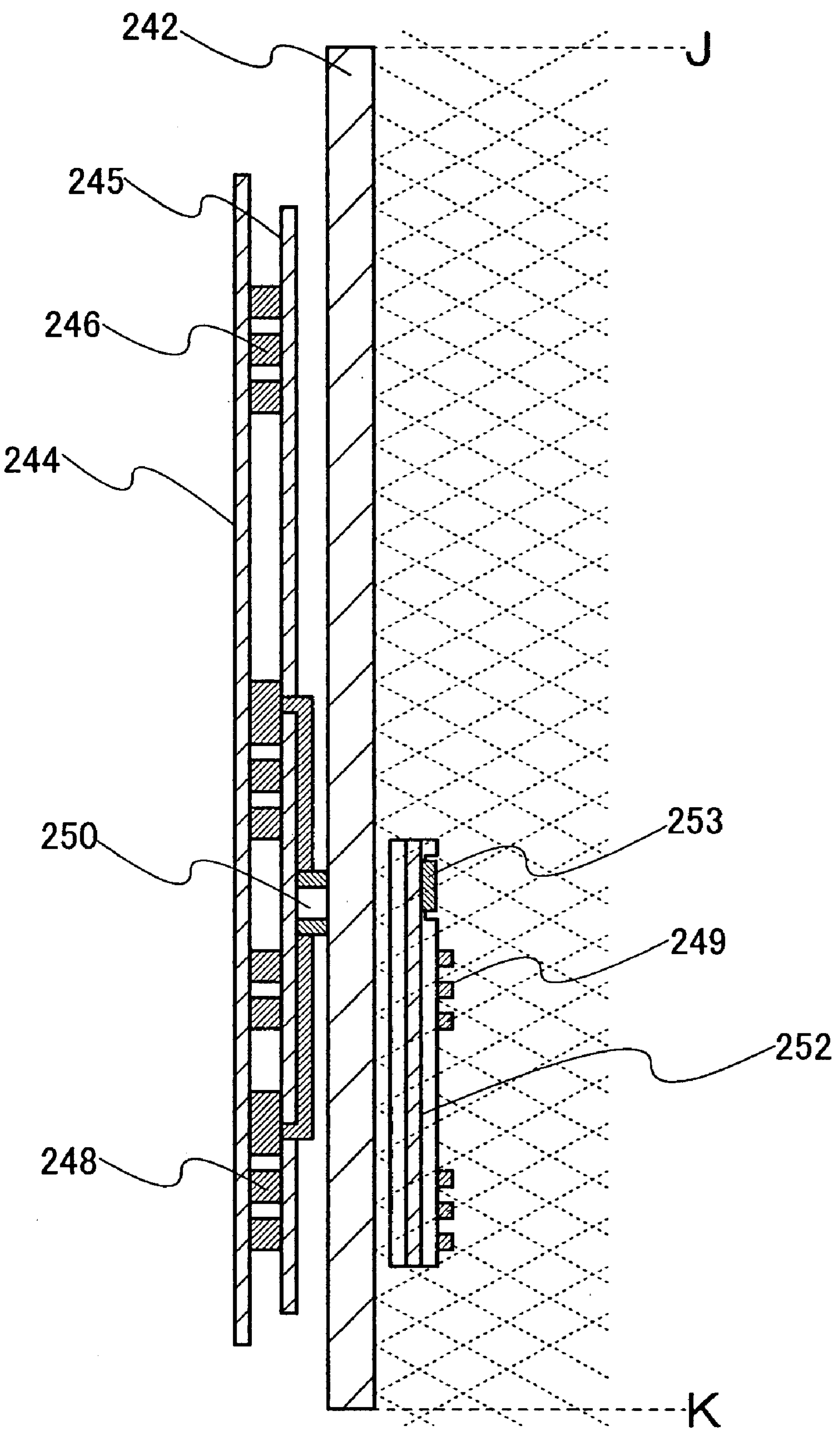
FIG. 17 is a diagram illustrating an essential part of a sensor device provided on the container.

FIG. 17 shows a cross-sectional view of FIG. 16A taken along the line J-K. The label 244 and the first base 245 are attached to the outside of the main body 242. The second base 252 provided with a sensor portion 253 and a third antenna 249 is disposed on an inner side of the main body 242. The second antenna 248 and the third antenna 249 are preferably disposed to be electromagnetically coupled. In this case, the second base 252 may be fixed to on an inner side of the main body 242.

In such a manner, the first base 245 on which a first antenna 246 communicating with the external device is formed and the second base 252 on which the sensor portion is formed are separated. With communication between the two bases using wireless communication, contents information of airtight containers can be detected. In this case, the sensor potion can be miniaturized; therefore, containers need not be enlarged. Moreover, it is preferable that a hole for forming wiring that connects the first base and the second base is not required to be formed on the main body 242.

FIG. 16A, FIG. 16B, and FIG. 17 show containers based on the structure of the sensor device shown in Embodiment Mode 1. Containers in accordance with the present invention can be structured based on the structure of the sensor device in any of, Embodiment Modes 2 to 4. For example, according to the structure shown in FIG. 4, a circuit portion such as the rectification circuit, the CPU, the modulation circuit, the demodulation circuit, and the memory portion and the power storage portion may be provided on a side of the label attached to the main body besides the first antenna and the second antenna. The third antenna, the sensor portion, and the like may be provided over the second base. Moreover, the first antenna may be a multi-frequency common antenna. With such a structure, functions similar to those in Embodiment Modes 1 to 4 can be achieved.

Figure 18:
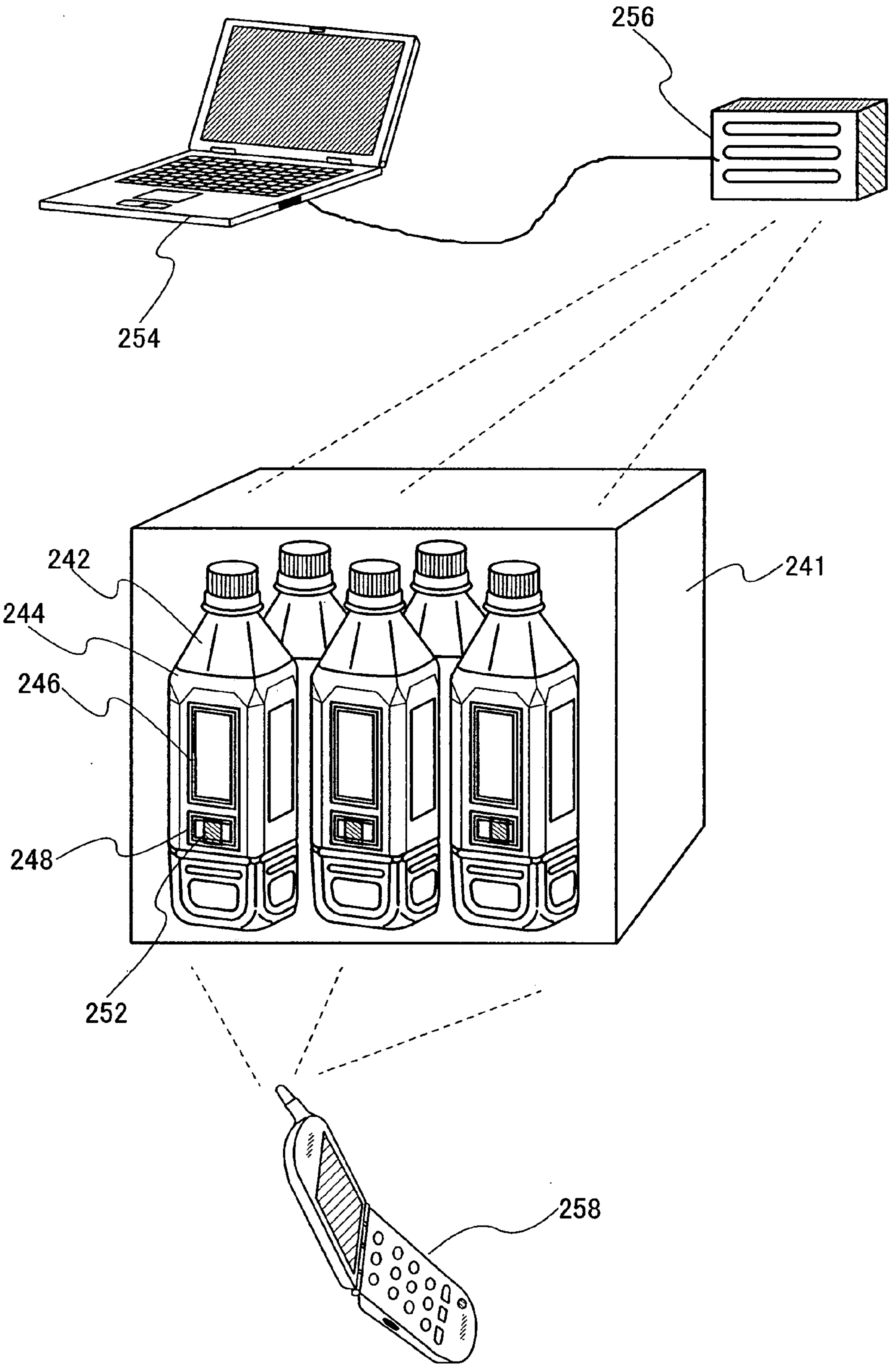
FIG. 18 shows containers included in a package.

FIG. 18 shows the main body 242 held in a package 241. This main body 242 has a structure similar to that in description of FIG. 16. Contents information of the main body 242 can be obtained by an external device 256 transmitting/receiving control signals. With a function preventing interference as a structure of the external device 256, information of each main body 242 in the package 241 can be obtained. The external device 256 is controlled by a computer 254. A network such as the Internet is available to the computer 254, whereby information in the package 241 can be obtained even when the external device 256 is operated from a distance.

Such a mode is usable, for example, in distribution of products. The external device 256 is provided on the back of transport vehicles such as trucks, which can be applied when each of the main body 242 in the package 241 is transported. It is effective to operate the external device 256 to grasp the main body 242, the state of loads contents. In addition, quality changes as to loads can be detected immediately. In this case, the physical quantity of contents of the main body 242 can be measured even in the case of no signal from the external device 256 since the power storage portion is provided in the sensor device attached to the main body 242. Further, the external device 256 may be provided with a storehouse where the package 241 is kept in order to operate the sensor device similarly. Besides, a portable informational terminal 258 may be employed instead of the external device 256.

As mentioned above, containers having the sensor device in accordance with the present invention include at least the following.

An aspect of the present invention is containers including an antenna for receiving electromagnetic waves on an exterior portion of a main body; a power storage portion, on an inner side of the main body, for storing electric power obtained by rectification of induced electromotive force generated when the antenna absorbs electromagnetic waves; a central processing unit, on an inner side of the main body, which operates with electric power supplied from the power storage portion; and a sensor portion for inputting a signal to the central processing unit, on an inner side of the main body.

An aspect of the present invention is containers including an antenna for receiving electromagnetic waves on an exterior portion of a main body; a power storage portion, on an inner side of the main body, for storing electric power obtained by rectification of induced electromotive power generated when the antenna absorbs electromagnetic waves; a central processing unit, which operates with electric power supplied from the power storage portion, on an exterior portion of a main body; and a sensor portion, which operates with electric power supplied from the power storage portion, on an inner side of the main body.

An aspect of the present invention is containers including a first base having a first antenna for receiving electromagnetic waves and a second antenna electrically connected to the first antenna, on an exterior portion of a main body; and a second base having a third antenna electromagnetically coupled the second antenna, a power storage portion for storing electric power obtained by rectification of induced electromotive power generated by the third antenna, a central processing unit, which operates with electric power supplied from the power storage portion, and a sensor portion, which operates with electric power supplied from the power storage portion, on an inner side of the main body.

An aspect of the present invention is containers including a first base having an antenna for receiving electromagnetic waves, a power storage portion for storing electric power obtained by rectification of induced electromotive power generated when the antenna absorbs electromagnetic waves, and a central processing unit, which operates with electric power supplied from the power storage portion, on an exterior portion of a main body; and a second base having a sensor portion for inputting a signal to the central processing unit, on an inner side of the main body.

According to the present invention, with the sensor device attached to containers, distribution history of products and a state of contents can be detected. In this case, the power storage portion is provided on the sensor device; therefore, the sensor device can operate to detect the state of contents instead of the external device performing transmission and reception of signals. Note that containers in accordance with the present invention are not limited to those in FIG. 16. Even containers for different purposes or applications can be applied to various situations when containers have a structure similar to those in the present invention.

This application is based on Japanese Patent Application serial no. 2006-243775 filed in Japan Patent Office on September 8, in 2006, the entire contents of which are hereby incorporated by reference.

What is claimed is:

1. A sensor device comprising:

a first antenna formed over a first base for receiving electromagnetic waves transmitted from an external device;

a second antenna formed over the first base and electrically connected to the first antenna;

a third antenna formed over a second base and electromagnetically coupled to the second antenna;

a power storage portion over the second base for storing electric power obtained by rectification of electromagnetic waves received by the third antenna; and a sensor portion formed over the second base and configured to operate with the electric power supplied from the power storage portion, wherein the first base and the second base are separated from each other.

2. A sensor device comprising:

a first antenna over a first base for receiving electromagnetic waves transmitted from an external device;

a power storage portion over the first base for storing electric power obtained by rectification of electromagnetic waves received by the first antenna;

a second antenna over the first base for transmitting electric power modified after being supplied from the power storage portion;

a third antenna over a second base electromagnetically coupled to the second antenna; and a sensor portion over the second base which operates with electric power obtained by rectification of electromagnetic waves received by the third antenna.

3. A sensor device according to claim 1, wherein the first antenna is a multi-frequency common antenna.

4. A sensor device according to claim 2, wherein the first antenna is a multi-frequency common antenna.

5. A sensor device comprising:

a first base provided with an antenna portion for receiving electromagnetic waves transmitted from an external device, a power storage portion for storing electric power obtained by conversion of electromagnetic waves received by the antenna portion, and a first coil antenna; and a second base provided with a sensor portion capable of measuring a physical quantity of an object and a second coil antenna, wherein communication and supply/reception of electric power between the first base and the second base are performed by the first coil antenna and the second coil antenna, which are electromagnetically coupled.

6. A sensor device comprising:

a first base provided with an antenna portion for receiving electromagnetic waves transmitted from an external device and a first coil antenna; and a second base including a sensor portion capable of measuring a physical quantity of an object, a power storage portion for storing electric power obtained by conversion of electromagnetic waves received by the antenna portion, and a second coil antenna, and wherein communication and supply/reception of electric power between the first base and the second base are performed by the first coil antenna and the second coil antenna, which are electromagnetically coupled, and wherein the first base and the second base are separated from each other.

7. A sensor device according to claim 5, wherein the antenna portion includes a multi-frequency common antenna.

8. A sensor device according to claim 6, wherein the antenna portion includes a multi-frequency common antenna.

9. A sensor device according to claim 1, wherein the power storage portion is a capacitor.

10. A sensor device according to claim 2, wherein the power storage portion is a capacitor.

11. A sensor device according to claim 5, wherein the power storage portion is a capacitor.

12. A sensor device according to claim 6, wherein the power storage portion is a capacitor.

13. A sensor device according to claim 9, wherein the capacitor is an electric double layer capacitor.

14. A sensor device according to claim 10, wherein the capacitor is an electric double layer capacitor.

15. A sensor device according to claim 11, wherein the capacitor is an electric double layer capacitor.

16. A sensor device according to claim 12, wherein the capacitor is an electric double layer capacitor.

17. A sensor device according to claim 1, wherein a part of the first base and a part of the second base are overlapped with each other.

18. A sensor device according to claim 2, wherein a part of the first base and a part of the second base are overlapped with each other.

19. A sensor device according to claim 5, wherein a part of the first base and a part of the second base are overlapped with each other.

20. A sensor device according to claim 6, wherein a part of the first base and a part of the second base are overlapped with each other.

* * * * *